(12) United States Patent
Manthena

(10) Patent No.: US 11,252,046 B2
(45) Date of Patent: Feb. 15, 2022

(54) SYSTEM FOR IDENTIFYING AND ASSISTING IN THE CREATION AND IMPLEMENTATION OF A NETWORK SERVICE CONFIGURATION USING HIDDEN MARKOV MODELS (HMMS)

(71) Applicant: Juniper Networks, Inc., Sunnyvale, CA (US)

(72) Inventor: Venkata Rama Raju Manthena, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 383 days.

(21) Appl. No.: 16/221,441

(22) Filed: Dec. 14, 2018

(65) Prior Publication Data
US 2020/0195517 A1    Jun. 18, 2020

(51) Int. Cl.
*H04L 12/24* (2006.01)
*H04L 12/26* (2006.01)
*H04L 12/851* (2013.01)
*H04L 29/06* (2006.01)
(Continued)

(52) U.S. Cl.
CPC .......... *H04L 41/16* (2013.01); *G06N 7/00* (2013.01); *G06N 20/00* (2019.01); *H04L 41/0803* (2013.01); *H04L 41/22* (2013.01); *H04L 43/16* (2013.01); *H04L 47/2441* (2013.01); *H04L 63/0254* (2013.01)

(58) Field of Classification Search
CPC ..... H04L 41/16; H04L 41/0803; H04L 41/22; H04L 43/16; H04L 47/2441; H04L 63/0254; G06N 20/00; G06N 7/00
See application file for complete search history.

(56) References Cited

U.S. PATENT DOCUMENTS 7,031,895 B1 * 4/2006 Takahashi ............. H04L 41/147
703/13
7,091,895 B2 * 8/2006 Honma ............... G11B 20/1403
341/155
(Continued)

OTHER PUBLICATIONS

Extended European Search Report for Application No. EP19180607.4, dated Jan. 3, 2020, 8 pages.
(Continued)

*Primary Examiner* — Patrice L Winder
*Assistant Examiner* — Aye M Aung
(74) *Attorney, Agent, or Firm* — Harrity & Harrity, LLP

(57) ABSTRACT

A device may receive a request for a network service configuration (NSC) that is to be used to configure network devices. The device may select a graphical data model that has been trained via machine learning to analyze a dataset that includes information relating to a set of network configuration services, where aspects of a subset of the set of network configuration services have been created over time. The device may determine, by using the graphical data model, a path through a set of states of the graphical data model, where the path corresponds to a particular NSC. The device may select the particular NSC based on the path determined. The device may perform a first group of actions to provide data identifying the particular NSC for display, and/or a second group of actions to implement the particular NSC on the network devices.

20 Claims, 12 Drawing Sheets

(51) Int. Cl.
*G06N 20/00* (2019.01)
*G06N 7/00* (2006.01)

(56) References Cited

U.S. PATENT DOCUMENTS

| | | | | |
|---|---|---|---|---|
| 7,774,440 | B1* | 8/2010 | Bagrodia | H04L 41/0823 709/221 |
| 8,631,464 | B2* | 1/2014 | Belakhdar | H04L 63/1408 726/3 |
| 8,909,926 | B2* | 12/2014 | Brandt | G06N 20/00 713/166 |
| 2006/0005228 | A1* | 1/2006 | Matsuda | H04L 63/0263 726/1 |
| 2009/0126023 | A1* | 5/2009 | Yun | H04L 63/1433 726/25 |
| 2010/0232593 | A1 | 9/2010 | Ku | |
| 2011/0088011 | A1 | 4/2011 | Ouali | |
| 2015/0135012 | A1* | 5/2015 | Bhalla | H04L 41/0631 714/26 |
| 2016/0285700 | A1 | 9/2016 | Gopalakrishnan et al. | |
| 2017/0364702 | A1* | 12/2017 | Goldfarb | H04L 63/14 |
| 2019/0036789 | A1* | 1/2019 | Kaplunov | H04L 41/142 |
| 2019/0050704 | A1* | 2/2019 | Yi | H04W 4/60 |
| 2019/0050754 | A1* | 2/2019 | Assem Aly Salama | G06N 5/003 |
| 2019/0191130 | A1* | 6/2019 | Wang | H04N 21/64738 |

OTHER PUBLICATIONS

Illner S., et al., "Automated Runtime Management of Embedded Service Systems Based on Design-time Modeling and Model Transformation", Industrial Informatics, 2005, 3rd IEEE International Conference, Australia, Aug. 10, 2005, pp. 134-136, XP010865385.

* cited by examiner

SYSTEM FOR IDENTIFYING AND ASSISTING IN THE CREATION AND IMPLEMENTATION OF A NETWORK SERVICE CONFIGURATION USING HIDDEN MARKOV MODELS (HMMS)

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some implementations, a method may include receiving, by a device, a request associated with one or more network service configurations that are to be used to configure a set of network devices. The request may include parameter data that identifies one or more guidelines for the one or more network service configurations. The method may include selecting, by the device, a graphical data model that may have been trained via one or more machine learning techniques to analyze a dataset that includes information relating to a set of network service configurations. The graphical data model may have been selected based on the parameter data included in the request. The method may include determining, by the device and by using the graphical data model, a path through states that are part of the graphical data model. The path may correspond to a particular network service configuration of a set of candidate network service configurations. Aspects of particular network service configurations, of the set of network service configurations, may have been created over time. The method may include selecting, by the device, the particular network service configuration, of the set of candidate network service configurations, based on the path determined using the graphical data model. The particular network service configuration includes at least one of: a network service, one or more network service features, or a chain of network services. The method may include performing, by the device, one or more actions after selecting the particular network service configuration. The one or more actions may include at least one of: a first group of one or more actions to provide data identifying the particular network service configuration for display via an interface, or a second group of one or more actions to implement the particular network service configuration on the set of network devices.

According to some implementations, a device may include one or more memories, and one or more processors, to receive a request for one or more network service configurations that are to be used to configure a set of network devices. The request may include parameter data that identifies one or more guidelines for the network service configuration. The one or more processors may determine, by using a graphical data model to analyze the parameter data, a path through states that are part of the graphical data model. The path may correspond to a particular network service configuration of a set of candidate network service configurations. The graphical data model may have been selected based on the parameter data. The graphical data model may have been trained via one or more machine learning techniques to analyze a dataset that includes information relating to a set of network service configurations, wherein aspects of particular network service configurations, of the set of network service configurations, have been created over time. The one or more processors may select the particular network service configuration, of the set of candidate network service configurations, based on the path determined using the graphical data model. The particular network service configuration may be for at least one network service. The one or more processors may determine a confidence score that represents a likelihood of the particular network service configuration satisfying the request, and may select a group of one or more actions to perform based on the confidence score. The one or more processors may perform the group of one or more actions that has been selected. The group of one or more actions may include at least one of: a first group of one or more actions to provide data identifying the particular network service configuration for display via an interface, or a second group of one or more actions to implement the particular network service configuration on the set of network devices.

According to some implementations, a non-transitory computer-readable medium may store instructions that include one or more instructions that, when executed by one or more processors of a device, cause the one or more processors to receive a request for a network service configuration that is to be used to configure a set of network devices. The request may include parameter data that identifies one or more guidelines for the network service configuration. The one or more instructions may cause the one or more processors to select a data model that may have been trained via one or more machine learning techniques to analyze a dataset that includes information relating to a set of network service configurations. The data model may have been selected based on the parameter data included in the request. The one or more instructions may cause the one or more processors to determine, using a data model, likelihoods of particular network services or particular network service features satisfying the request. The data model may include values that are associated with a set of candidate network service configurations. The one or more instructions may cause the one or more processors to select the particular network service configuration, of the set of candidate network service configurations, based on the likelihoods of the particular network services or the particular network service features satisfying the request. The one or more instructions may cause the one or more processors to determine a confidence score that represents a likelihood of the particular network service configuration satisfying the request, and to select a group of one or more actions to perform based on the confidence score. The one or more instructions may cause the one or more processors to perform the group of one or more actions that has been selected. The group of one or more actions may include at least one of: a first group of one or more actions to provide data identifying the particular network service configuration for display via an interface, or a second group of one or more actions to implement the particular network service configuration on the set of network devices.

DETAILED DESCRIPTION

Figure 1A:
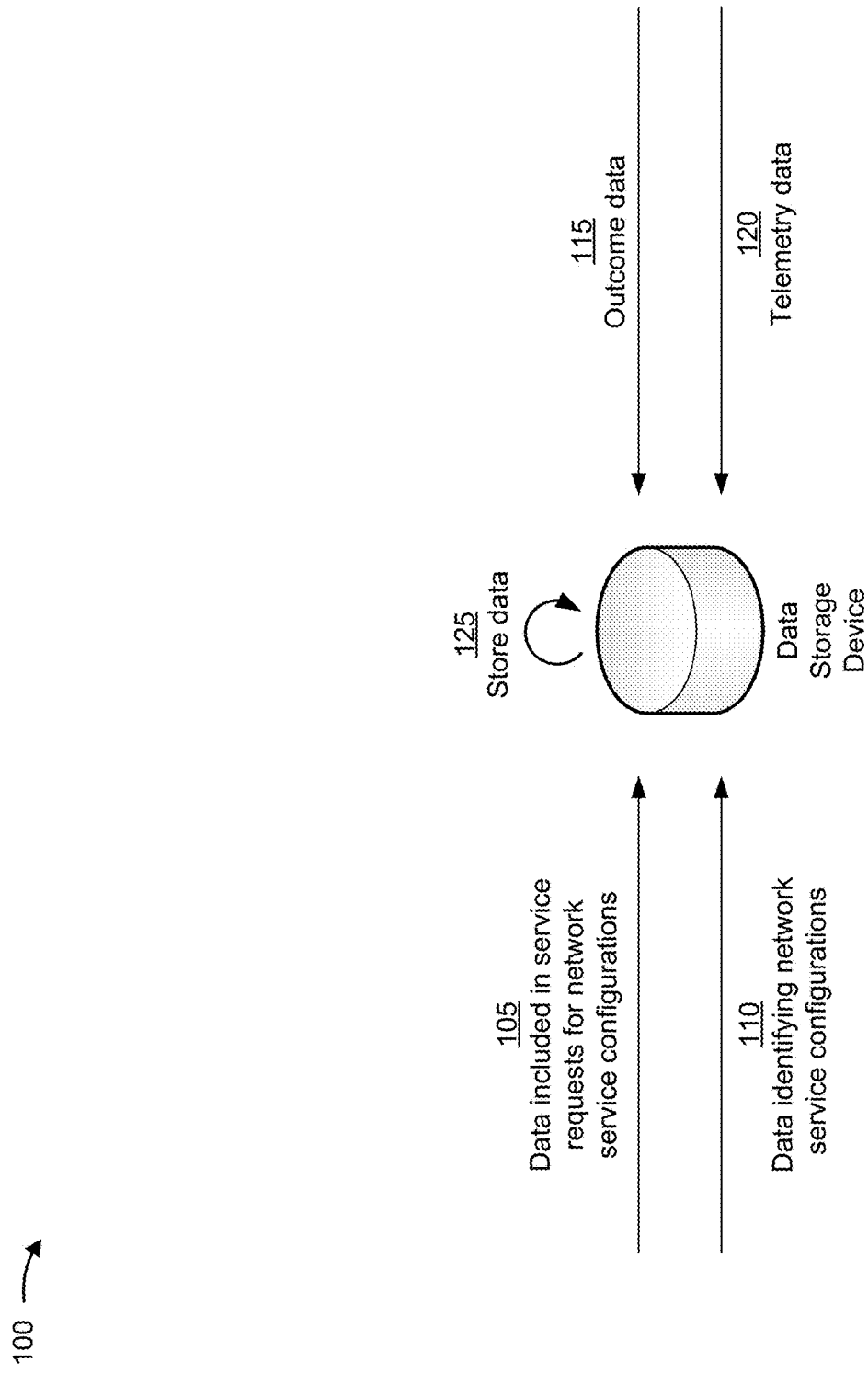
FIGS. 1A-1E are diagrams of one or more example implementations described herein.

The following detailed description of example implementations refers to the accompanying drawings. The same reference numbers in different drawings may identify the same or similar elements.

A network service provider may use a team of network administrators to create (e.g., design) network services and/or chains of network services (often referred to as network service chains) that may be configured and/or deployed on a group of network devices. For example, a client organization may wish to use the network service provider for various network services and may provide the network service provider with a list of guidelines that are intended to capture the network service needs of the client organization. For example, the list of guidelines may include a first guideline that requests that network traffic be protected by network security services (e.g., a firewall service, an intrusion prevention system (IPS) service, and/or the like), a second guideline that requests that traffic be protected by content security services (e.g., network services that provide confidentiality, protect intellectual property, etc.), and/or the like. The guidelines may be provided to a network administrator, who may be tasked with using industry and domain knowledge to create a network service or a chain of network services based on the guidelines.

However, the network administrator may not be able to effectively create a network service or a chain of network services based on the guidelines. For example, a high-level guideline indicating that traffic is to be protected by network security services may be too broad of a request to help the network administrator to make low-level determinations, such as which firewall provider to select for the firewall, which firewall rules and/or policies to use with the firewall, and/or the like. Additionally, creation of the network service or the chain of network services is a manual process that is prone to user errors. These errors translate into problems with the network after the network service or the chain of network services are deployed.

Some implementations described herein provide a service management platform to use machine learning to recommend a network service configuration and to perform one or more actions that cause the network service configuration to be implemented (e.g., configured and/or deployed). For example, a team of network administrators many create, update, and/or implement a set of network service configurations. In this case, telemetry data may be gathered and provided to the service management platform. The telemetry data may identify events caused by network traffic that has traversed through the set of network devices. In a first set of cases, data identifying the set of network service configurations may not be provided to the service management platform. In a second set of cases, data identifying the set of network service configurations may be provided to the service management platform. In each of these sets of cases, the service management platform may train a data model, as will be described in detail further herein.

In some implementations, the service management platform may train a data model, such as a Hidden Markov Model (HMM), in a manner that is able to analyze the telemetry data to predict an order in which the particular aspects of the network service configurations were created, updated, deleted, and/or implemented. This may allow the service management platform to train the HMM to generate a recommendation for a network service configuration, even if the data identifying the set of network service configurations was not provided to the service management platform.

In some implementations, the data model may be used as part of an application that allows users to create network service configurations. For example, a user, such as a network administrator, may interact with a user device to access the application. In this case, the user may interact with an interface of the application to generate and provide a request for a network service configuration to the service management platform. The request may include, for example, parameter data that identifies one or more guidelines that may be used to create the network service configuration.

Furthermore, the service management platform may select the data model (e.g., from a set of trained data models). Additionally, the service management platform may use the data model to identify likelihoods of network services and/or network service features satisfying the request. For example, if the data model is the HMM, the HMM may include a set of states that represent particular network services and/or particular network service features, and the service management platform may use the HMM to determine a path through one or more of the states. In this case, the service management platform may select a network service configuration that includes one or more network services and/or one or more network service features that were identified in the path. Additionally, the service management platform may provide data identifying the selected network service configuration to the user device, may perform one or more actions that cause the selected network service configuration to be implemented, and/or the like.

In this way, the service management platform utilizes machine learning to intelligently provide the user with a recommendation of a network service configuration. This conserves resources (e.g., processing resources, network resources, memory resources, and/or the like) that would otherwise be wasted implementing an ineffective network service configuration (e.g., a network service configuration that does not adequately satisfy needs of a client organization), resources that would be wasted trying to support network traffic using aspects of the ineffective network service configuration, resources that would be wasted resolving network issues created by the ineffective network service configuration, and/or the like.

Additionally, several different stages of the process described herein are automated, which may remove human subjectivity and waste from the process, and which may improve speed and efficiency of the process and conserve computing resources (e.g., processor resources, memory resources, and/or the like). For example, by recommending a network service configuration, the user (e.g., the network administrator) may not have to create the network service configuration and/or may only have to review the network service configuration that has been recommended. This conserves resources of the user device that would otherwise be wasted were the user to create numerous drafts of the network service chain, reduces or eliminates chances of human error, and improves quality and efficiency of the process. Additionally, implementations described herein use a rigorous, computerized process to perform tasks or roles that were not previously performed or were previously performed using subjective human intuition or input.

Figure 1B:
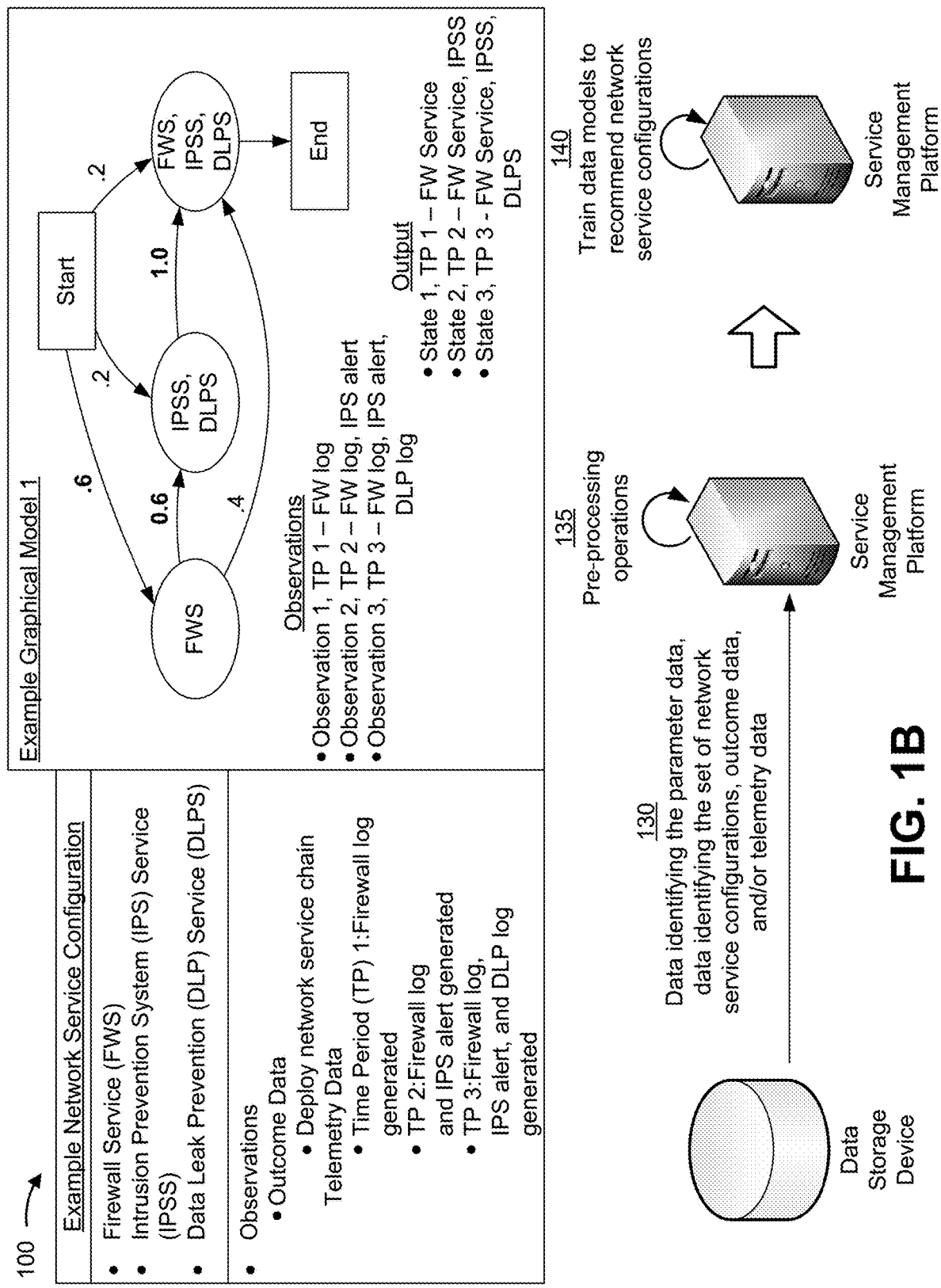
Figure 1C:
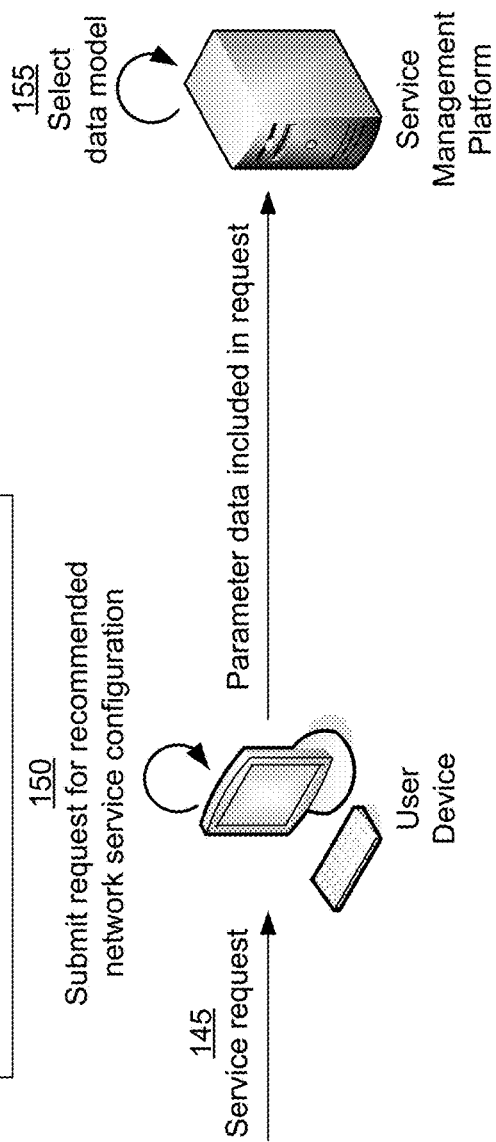
Figure 1D:
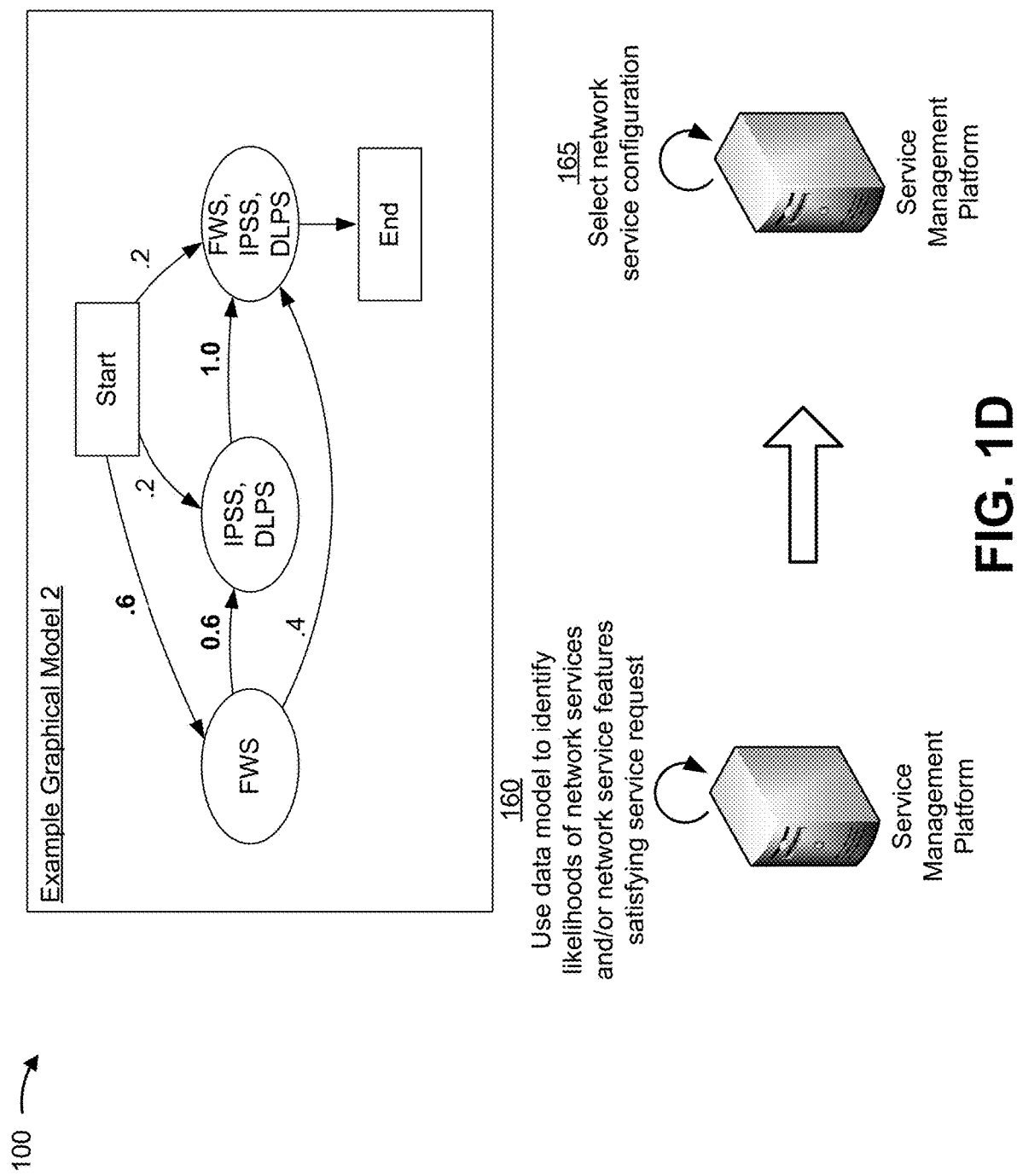
Figure 1E:
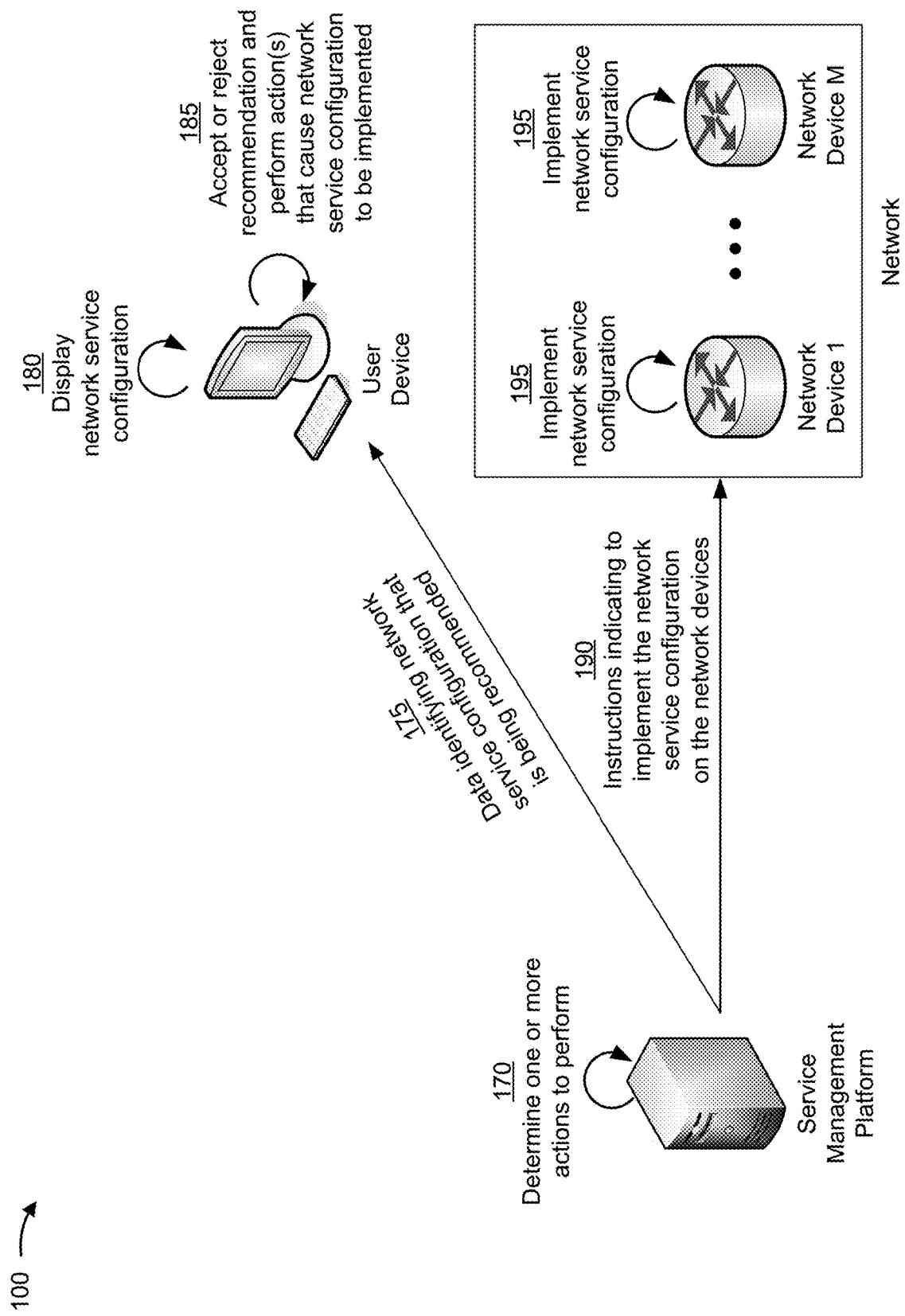

FIGS. 1A-1E are diagrams of one or more example implementation(s) 100 described herein. Example implementation(s) 100 may include a data storage device, a group of network devices (shown as network device 1, . . . , network device M) that are part of a network, a service management platform, and a user device. As shown in FIGS. 1A and 1B, the service management platform may train a set of data models (e.g., Hidden Markov Model (HMMs)) to recommend network service configurations. As shown in FIGS. 1C-1E, a user (e.g., a network administrator) may be tasked with creating a network service configuration, and the service management platform may use a data model to generate and provide the user with a recommended network service configuration.

A network service configuration, as used herein, may include a network service, a set of features of a network service, a chain of network services (e.g., two or more network services), and/or the like. The network service or the chain of network services may include a security service (e.g., a firewall service, an intrusion prevention system (IPS), a data leak prevention (DLP) service, a secure sockets layer (SSL) proxy service, and/or the like), a content security service, a packet filtering service, a packet translation service, an authentication service, a classification service, a proxy service, a content filtering service, a packet forwarding service, a uniform resource locator (URL) filtering service, and/or the like. Additionally, a network service configuration may be hosted on a network device, a data center server, an endpoint device, a client device, a vendor device, a user device, and/or the like.

A network service feature, as used herein, may refer to a policy of a network service, a function of a network service, a rule used as part of a network service, a characteristic of a network service, and/or the like. As an example, a firewall service may include features such as a firewall identifier, a vendor identifier (e.g., identifying a vendor that is providing the firewall service), capacity information and/or performance capabilities of the firewall, compatibility information of the firewall, and/or the like. Additionally, or alternatively, the features of the firewall service may include one or more firewall rules or policies that indicate types of traffic to inspect, internet protocol (IP) addresses to allow or block, ports to open or close to particular types of traffic, and/or the like.

Figure 5:
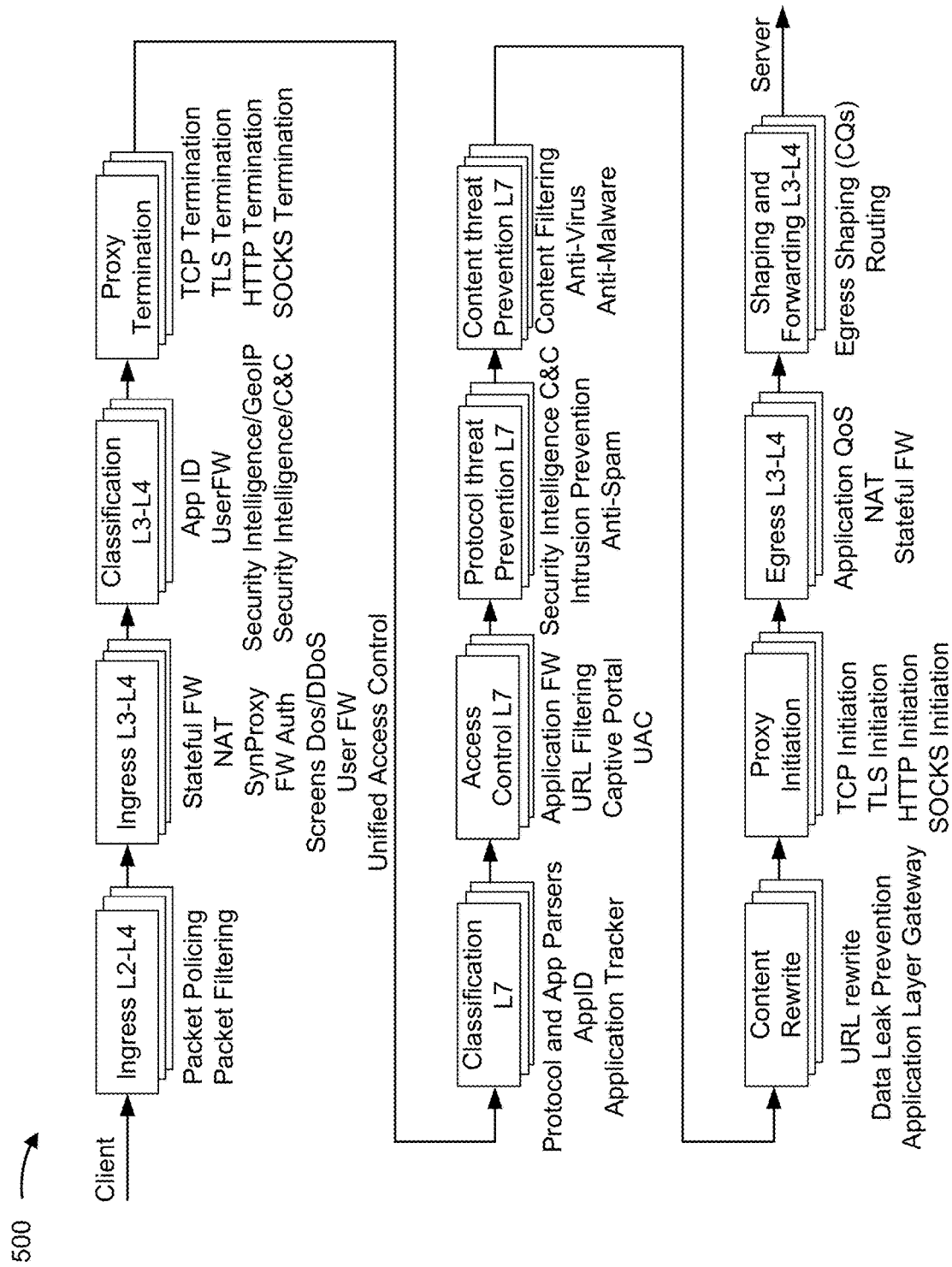
FIG. 5 is a diagram of an example network service configuration.

These network services and/or network service features are provided by way of example. In practice, any number of other network services and/or network service features may be included in a network service configuration. Additionally, FIG. 5 provides an example of a more detailed chain of network services and corresponding network service features.

As shown in FIG. 1A, the data storage device may store data that may be used to train the set of data models. For example, over time, network administrators of a network service provider may create, update, and/or implement a set of network service configurations.

As shown by reference number 105, data included in a set of service requests for the set of network service configurations may be provided to the data storage device. For example, when a client organization submits a service request for a network service configuration, the service request may be provided to a user device of a network administrator. The network administrator may be tasked with creating the network service configuration based on information included in the service request. The service request may include data identifying a type of network service configuration that is being requested, a client identifier that identifies a client providing the service request, data identifying one or more guidelines for the network service configuration that is being requested (as defined further herein), and/or the like. In this case, the data included in the service request may be provided to the data storage device.

As shown by reference number 110, data identifying the set of network service configurations may be provided to the data storage device. The data identifying the set of network service configurations may include data identifying a network service, data identifying a set of network service features associated with a network service, data identifying a chain of network services, and/or the like.

In some implementations, the data storage device may receive data identifying one or more network service configurations from user devices. For example, the user devices may support or have access to an application that is used for creating network service configurations. In this case, the team of network administrators (referred to hereafter as users) may interact with the application to create network service configurations. In some implementations, when a user saves or completes a network service configuration, a user device may be configured to provide data identifying the network service configuration to the data storage device. Additionally, or alternatively, the data storage device may request the data identifying the network service configuration from the user device.

However, in some cases, because many of the network service configurations were created, updated, deleted, and/or implemented over time, the data storage device may not be provided with data that indicates a time at which various aspects of the network service configurations were created, updated, deleted, and/or implemented. For example, if a chain of network services includes ten network services, the data identifying the chain may identify the ten network services, but may not include data indicating that four of the network services were created at a first time period and deployed at a second time period, that another two network services were created at a third time period and deployed at a fourth time period, and that another four network services were created at a fifth time period and deployed at a sixth time period. This information would be useful to have when training the data model, as will be shown further herein.

In some implementations, the data identifying the set of network service configurations may not be provided to the data storage device. For example, the user devices may not be configured with the software needed to collect the data, the data may not be collected for reasons internal to an organization utilizing the user devices (e.g., monitoring actions of employees, such as network administrators, may upset the employees), the data may not be collected for security reasons (e.g., a security breach involving this data would potentially disclose confidential information to competitor organizations), and/or for similar types of reasons. In this case, the service management platform may analyze the outcome data and/or the telemetry data (as each defined below) to identify a set of observations that may be used to determine a sequence of states of a data model, as will be described further herein.

Additionally, or alternatively, the data storage device may receive outcome data and/or telemetry data that may be used when training the data model. In some cases, the outcome data and/or the telemetry data may be used to determine a sequence or order at which particular aspects of the set of network service configurations were created, updated, deleted, and/or implemented, as will be described further herein.

As shown by reference number 115, the data storage device may receive outcome data. For example, after the users create the network service configurations, outcome data may be generated and provided to the data storage device (e.g., by the user devices).

The outcome data may identify a manner in which the set of network service configurations were used. For example, the outcome data include data identifying that a network service configuration was saved, deployed, terminated, aborted, and/or the like. Additionally, or alternatively, the outcome data may include other metadata, such as data identifying a reasoning behind a particular outcome (e.g., a network administrator may input a reason why a particular network service configuration was deployed, was terminated, etc.), metadata identifying a time spent creating, updating, and/or implementing a network service configuration (e.g., an aggregate time, a time spent creating and/or implementing each network service and/or network service feature within the network service configuration, and/or the like), and/or the like. In some cases, the metadata may be used when assisting users on making more efficient configuration and/or deployment decisions.

As shown by reference number 120, the data storage device may receive telemetry data. For example, as network traffic traverses through the group of network devices that are implementing particular network configuration services, telemetry data may be collected and provided to the data storage device. The telemetry data may include events data that identifies events caused by network traffic that has traversed through the set of network devices that have implemented the set of network service configurations, session data associated with one or more sessions that are being used to support the network traffic, and/or the like.

In some implementations, a network device may collect and report events data. For example, as the network device receives network traffic, the network device may use the one or more network services to inspect and/or analyze the network traffic. In this case, the network device may generate a log, an alert, a message, and/or the like, which may identify that an inspection and/or an analysis was performed, may identify a result of the inspection and/or analysis, and/or the like.

To provide a few specific examples, the network device may create a log indicating that a firewall permitted or rejected a packet (which may indicate a time at which the log was created), may create a log indicating that a URL filter permitted or rejected a packet associated with a URL (which may indicate a time at which the log was created), may create a log and/or an alert caused by an intrusion prevention system (IPS) (which may indicate a time at which the log and/or the alert was created), may create a log associated with a security intelligence (SecIntel) service that identifies a suspicious packet (which may indicate a time at which the log was created), and/or the like.

Additionally, or alternatively, a network device may collect and report session data. For example, as the network device receives an indication that a session is active, the network device may generate and/or provide session data associated with session to the data storage device. The session data may include data identifying a type of traffic that is being sent and/or received during a session, data identifying a type of application associated with the session, data identifying one or more endpoints of the traffic flow of the session (e.g., a source internet protocol (IP) address, a destination IP address, etc.), data identifying a geographic location of the one or more endpoints, data identifying one or more ports used during the session, data identifying a network service and/or a network service feature being utilized during the session, data identifying a status of the session (e.g., active, timed out, etc.), and/or the like.

Additionally, or alternatively, another device may collect and/or report the telemetry data. For example, the telemetry data may be collected and/or reported using one or more endpoint monitoring systems, one or more client devices (e.g., if a client device is hosting a network service locally), one or data center servers, and/or any other device that may have access to the network traffic.

In this way, the data storage device receives the data that may be used to train the data model, and may, as shown by reference number 125, store the data in a manner that is accessible to the service management platform.

As shown in FIG. 1B, and by reference number 130, the service management platform may receive, from the data storage device, the parameter data included in requests for the set of network service configurations, the data identifying the set of network service configurations, the outcome data, and/or the telemetry data (referred to hereafter as training data). For example, the service management platform may provide a request to the data storage device, which may cause the data storage device to provide the service management platform with the training data. In some cases, the data storage device may be configured to provide the service management platform with the training data (e.g., automatically, periodically over an interval, and/or the like).

In some implementations, the service management platform may receive the training data from the set of data sources. For example, the set of data sources may be configured to provide the data directly to the service management platform (rather than to the data storage device). In some cases, the service management platform may obtain the data from the set of data sources (e.g., automatically, periodically over an interval, and/or the like).

As shown by reference number 135, the service management platform may perform one or more pre-processing operations needed to train the data model. For example, the service management platform may standardize the data to a uniform format. As an example, the data obtained from the data storage device may be in multiple formats, multiple file types, and/or the like, and the service management platform may convert the data to a uniform format (e.g., text) that may be subjected to further processing.

As shown by reference number 140, the service management platform may train the set of data models to recommend network service configurations. A data model, as used herein, may refer to a framework that is able to apply one or more machine learning techniques to analyze input values and to generate the output values that are to be used as indicators of a recommended network service configuration. In some implementations, a data model may be a graphical data model, such as a Markov Model (MM) a Hidden Markov Model (HMM), a Gaussian Mixture Model (GMM), a model based on an artificial neural network, and/or a similar type of model. In some implementations, the data model may be another type of data model (e.g., a data model that is not classified as a graphical data model).

In some implementations, the service management platform may train a HMM. For example, the service management platform may use the training data to train a HMM to output, based on particular input values (e.g., values identifying one or more observations), one or more states that form a path through the HMM. The path may represent a particular network service configuration, as further described below.

In some implementations, to train the HMM, the service management platform may identify a set of observations. For example, the service management platform may process the outcome data and/or the telemetry data to identify a set of observations. An observation may be based on a particular outcome data value, a particular telemetry data value, a set of telemetry data values, an absence of one or more values (e.g., an absence of a firewall log at a particular time period), and/or the like. For example, a firewall log may have been created by a network device when network traffic of a session was inspected by a firewall, an intrusion prevention system (IPS) alert may have been created shortly thereafter, and a data leak prevention (DLP) log may have been created shortly after that. In this case, the firewall log, the IPS alert, and the DLP log, may be identified as being part of an observation that may assist in training the HMM, as described further herein.

In some implementations, to train the HMM, the service management platform may generate a set states. For example, in a supervised learning scenario where the data identifying the set of network service configurations is available, the service management platform may process the data identifying the set of network service configurations to identify each network service and/or each network service feature included in the set of network service configurations. In this case, the service management platform may generate a set for each network service and/or each network service feature.

As another example, in an unsupervised learning scenario where the data identifying the set of network service configurations is not available, the service management platform may still determine the set of states. For example, the service management platform analyze the telemetry data and/or the outcome data to derive the set of states. As an example, if the telemetry data includes a firewall log, this may serve as an indicator that a firewall had been configured and deployed. As such, the service management platform may be able to generate one or more values that represent a state for a firewall service. This process may be repeated until the service management platform is able to derive the set of states. In some cases, some data identifying network service configurations may be provided (but the data may not represent a complete list of network service configurations). In these cases, a combination of the techniques described above may be used to generate the set of states.

In some implementations, to train the HMM, the service management platform may generate a set of model parameters for the HMM. For example, as part of the unsupervised learning scenario, the service management platform may generate a set of states, a set of start probabilities, a set of state transition probabilities, and a set of emission probabilities. The set of start probabilities indicate likelihoods of starting in a particular state. The set of state transition probabilities may indicate likelihoods of a state transitioning to another state. The set of emission probabilities may indicate likelihoods of an observation occurring in a particular state. To generate the set of model parameters of the HMM, the service management platform may generate the set of model parameters by generating random values, by generating values based on domain knowledge of a network administrator, based on the values included in the training data, and/or the like. In some cases, the service management platform may generate one or more model parameters using a Baum-Welch technique, an expectation-maximization technique, a technique using a Markov Chain Monte Carlo (MCMC) sampling, and/or the like.

In some implementations, to train the HMM, the service management platform may determine, based on particular observations, a best-fit path through the set of states. For example, in a supervised learning scenario, the service management platform may have access to values that represent the set of states, but may not know the state sequence. In this case, the service management platform may perform a Viterbi analysis or a similar type of analysis to determine a best-fit path through the set of states. Additionally, the service management platform may, while performing the Viterbi analysis, select a starting state based on the set of starting state probabilities, and may select one or more additional states by selecting states that have a highest state transition probability (relative to other states that have yet to be selected). A best-fit path may refer to a sequence of states that has a highest likelihood of satisfying a particular service request, a highest likelihood of causing a particular observation or sequence of observations to occur, and/or the like.

As shown in FIG. 1B as a specific example, the service management platform may receive, as part of the training data, a network service configuration that includes a firewall service, an IPS service, and a DLP service. Additionally, the service management platform may have telemetry data indicating that at a first time period, a firewall log was generated, that at a second time period, a firewall log and an IPS alert were generated, and that at a third time period, a firewall log, an IPS alert, and a DLP log were generated. In this example, a starting state S0 may represent that at time T0, a network service configuration has yet to be selected by a user.

Because the telemetry data for the first time period includes the firewall log, but not the IPS alert or the DLP log, the service management platform may determine that the firewall service state, at time T1, has the highest probability of being a first state. This may cause the service management platform to transition from the starting state S0 to the firewall service state (which is now the first state S1, at time T1). The service management platform may use the same technique to determine that the IPS service state, at time T2, has the highest probability of being the second state S2, and to determine that the DLP service state, at time T3, has the highest probability of being the third state S3. In this way, the service management platform is able to use the HMM to determine the order in which the network administrator created the network service chain. It is to be understood that this is provided by way of example, and that in practice, a more complex HMM may be implemented that is able to account for hundreds of states, thousands of states, tens of thousands of states, or more.

In some implementations, to train the HMM, the service management platform may update (i.e., tune) the set of model parameters of the HMM. For example, in the unsupervised learning scenario, the service management platform may update the set of model parameters of the HMM to improve accuracy of the state sequences generated by the HMM. In this case, the service management platform may update the set of model parameters (e.g., the set of state transition probabilities, etc.) based on analysis of other network service configurations included in the training data (which may each correspond to particular observations). The analysis may be performed using the Baum-Welch technique, the expectation-maximization technique, and/or a similar type of technique.

In some implementations, the service management platform may train the set of data models. For example, the service management platform may train data models that are specific to a particular set of parameters included in a service request made by a client organization (which may include guidelines that represent the intent of the client organization). Additionally, or alternatively, the service management platform may train data models based on one or more other classifications, such as by training data models that are for specific client organizations, data models that are for specific business units within client organizations, data models that are for groups of client organizations (e.g., based on industry domain or another type of classification), data models that are for specific types of devices (e.g., specific types of network devices, client devices, etc.), and/or the like.

In some implementations, another device may train one or more data models and may provide the one or more data models to the service management platform. For example, a device associated with a software developer (e.g., a desktop computer) may be used to train a data model. After the data model is trained, the trained data model may be provided to the service management platform. For example, the trained data model may be provided to the service management platform by uploading the trained data model to a location that is accessible to the service management platform, by using a communication interface, such as an application programming interface (API), to transmit the trained data model (or a compressed version of the trained data model) to the service management platform, and/or the like.

In this way, the service management platform may train the data model to recommend network service configurations. Furthermore, by identifying the set of states and/or the state sequence, the service management platform is able to improve accuracy of recommendations made by the HMM (relative to a model that is unable to identify the states, identify the state sequence, etc.).

As shown in FIG. 1C, and by reference number 145, the user device may receive a service request. For example, the user device may receive a service request from a device of a client organization, from another device of the network service provider (e.g., a device operated by a manager of a network administrator), and/or the like.

The service request may include data identifying a type of network service configuration that is being requested (e.g., a request to create a network service and/or a chain of network services, a request to update an existing network service and/or an existing chain of network services, and/or the like), a client identifier that identifies a client providing the service request, data identifying one or more guidelines for the network service configuration that is being requested, and/or the like. The one or more guidelines may be high-level service requests that are intended to capture the network service needs of the client organization. For example, the one or more guidelines may include a first guideline that requests that one or more network services provide network security (e.g., network services that protect traffic traveling through one or more networks between a source and a destination, such as a firewall service, an intrusion prevention system (IPS) service, and/or the like), a second guideline that requests that one or more network services provide content security (e.g., network services that provide confidentiality, protect intellectual property, and/or the like), a third guideline that requests that one or more network services provide authentication of particular network traffic, and/or the like.

In some implementations, the user device may be configured with or may have access to an application that allows a user (e.g., a network administrator, etc.) to create network service configurations. For example, the application may be installed on the user device or may be a web application that is accessible via a web interface. In this case, the application may include one or more tools that the user may use to create network service configurations. For example, the application may include an integrated development environment (IDE) and/or a similar type of environment whereby the user may interact with one or more interfaces to create a network service configuration (e.g., by selecting a network service or a network service feature from a menu, by creating a new network service or a new network service feature using features of the IDE, and/or the like). Additionally, the application may include an interface that allows the user to create and submit requests for recommended network service configurations.

As shown by reference number 150, a network administrator may interact with the application to submit a request for a recommended network service configuration. For example, the network administrator may read the service request, and may interact with the application to input information included in the service request as parameters in the request for the recommended network service configuration. In some cases, data identifying the service request may be uploaded as part of the request for the recommended network service configuration. When the user submits the request, the user device may provide the request to the service management platform.

As shown by reference number 155, the service management platform may select a data model. For example, the service management platform may select a data model based on the parameter data included in the request. In this case, as described above, the service management platform may have trained the set of data models (or received the set of data models that have been trained by another device), and may select the data model, from the set of data models, based on the parameter data included in the request. As a specific example, the service management platform may reference a data structure that associates data model identifiers for specific data models with identifiers of specific types of requests, identifiers of specific types of parameter data, identifiers of specific client organizations, and/or the like. This may allow the service management platform to locate an identifier of a data model that was stored in association with identifiers that match parameter data of the request, which will allow the service management platform to select the data model that is most fit to generate a recommendation for an appropriate network service configuration.

In this way, the user may use the application to submit a request for a network service configuration.

As shown in FIG. 1D, and by reference number 160, the service management platform may use the data model to determine likelihoods of network services and/or network service features satisfying the service request made by the client organization. For example, if the data model is the HMM, the HMM may include a set of states that represent particular network services and/or particular network service features, a set of start probabilities, a set of state transition probabilities, and a set of emission probabilities, as described elsewhere herein. In this case, the service management platform may select a first state by selecting a state that has a highest start state probability. Additionally, the service management platform may reference the set of state transition probabilities to select one or more additional states, based on each additional state having a highest available state transition probability. In some cases, selection of a next state may not be based on the highest-available state transition probability. For example, the selection may be based on one or more observations, a sequence of observations, one or more emission probabilities, and/or the like. In this way, the service management platform is able to select one or more states that collectively define a path through the HMM.

As shown in FIG. 1D by Example Graphical Model 2, the HMM may include three states, a firewall service state, an IPS service state, and a DLP service state. In this example, the service management platform may select the firewall service state as a first state based on the firewall service state having a highest available start state probability (shown by a value of 0.6, which is greater than each respective value of 0.2). Additionally, the service management platform may select the IPS service state based on the IPS service state having a highest available state transition probability (shown by a value of 0.6, which is greater than a value of 0.4). Furthermore, the service management platform may select the DLP service state based on the DLP service state having a highest available state transition probability (shown as a value of 1.0 because this state is the only remaining state). In some cases (not shown), the HMM may also consider values that identify probabilities of remaining in a particular state.

This example is provided simply to illustrate the processing performed by the HMM. In practice, the HMM may include any number of states needed to represent a complete set of available network services and/or network service features.

As shown by reference number 165, the service management platform may select a network service configuration to recommend to the user. For example, if the data model is the HMM, each state in the path may correspond to a particular network service and/or a particular network service feature, which may allow the service management platform to select a network service configuration that includes each network service and/or network service feature identified in the path. In this case, the network service configuration may be selected from a set of candidate network service configurations that are available to the client organization.

In this way, the service management platform selects a network service configuration that can be recommended to the user.

As shown in FIG. 1E, and by reference number 170, the service management platform may determine one or more actions to perform. For example, the service management platform may be configured to provide data identifying the network service configuration that is being recommended to the user device and may be configured to provide the group of network devices (shown as Network Device 1, . . . , Network Device M) with instructions to implement (e.g., configure and/or deploy) the network service configuration.

In some implementations, the service management platform may determine an overall confidence score that represents a likelihood of the network service configuration satisfying the request (and/or the service request). For example, if the data model is the HMM, the service management platform may determine an overall confidence score for the path. The overall confidence score may be based on a set of confidence scores that represent likelihoods of particular states in the path satisfying the request (and/or the service request). As an example, if a first state is selected based on having a state transition probability of 51%, the first state may be assigned a lower confidence score than a second state that is selected based on having a state transition probability of 91%.

Additionally, the service management platform may determine whether the overall confidence score satisfies a threshold confidence score. The threshold confidence score may represent a confidence level that may justify automatically implementing the network service configuration on the group of network devices (e.g., without review by the user).

As shown by reference number 175, the service management platform may provide the user device with the data identifying the network service configuration that is being recommended. In this case, the service management platform may have determined that the overall confidence score did not satisfy the threshold confidence score, which may have caused the service management platform to provide the data identifying the network service configuration to the user device. As shown by reference number 180, the user device may display the network service configuration. For example, the user device may display the network service configuration via an interface of the application used to create network service configurations. This may allow the user to view the network service configuration, modify the network service configuration, choose to accept or reject the network service configuration, and/or the like.

As shown by reference number 185, the user may interact with the interface of the application to accept or reject the network service configuration that has been recommended. If the user rejects the network service configuration, data indicating that the network service configuration has been rejected may be provided to the service management platform (e.g., and used to retrain the HMM). In some cases, the user may be prompted to provide a reason for rejecting the network service configuration, in which case data identifying the reason may also be provided to the service management platform (and used to retrain the HMM). If the user accepts the network service configuration, the user may perform one or more actions to implement the network service configuration. For example, the user may implement the network service configuration manually, may create instructions that cause another device to implement the network service configuration, and/or the like.

As shown by reference number 190, the service management platform may provide, to the group of network devices, a set of instructions that indicate to implement the network service configuration on the group of network devices. In this case, the service management platform may have determined that the overall confidence score satisfied the threshold confidence score, which may have caused the service management platform to generate and provide the group of network devices with the set of instructions.

The set of instructions may include a first set of instructions that indicate where to obtain (e.g., download) one or more network services that are included in the network service configuration, a second set of instructions that indicate how to configure (e.g., install) the one or more network services, a third set of instructions that indicate how to deploy the one or more network services, and/or the like. In some cases, in addition to providing the set of instructions, the service management platform may provide the group of network devices with the one or more network services (e.g., with executables needed to install the one or more network services).

As shown by reference number 195, the group of network devices may implement the network service configuration. For example, the group of network devices may use the first set of instructions to obtain the one or more network devices, may use the second set of instructions to configure the one or more network services, may use the third set of instructions to deploy the one or more network services, and/or the like.

As an example, the service management platform or a network service may generate and/or provide, to a network configuration and/or deployment service, instructions requesting to implement the network service configuration onto the network device. The instructions may be provided via a protocol (e.g., NETCONF, REST APIs, etc.). The instructions may include device information for the network device (e.g., an IP address of the network device and/or any other information that may be needed to implement the network service configuration), information that specifies the network service configuration that is to be implemented on the network device, and/or the like. To implement the network service configuration, the network configuration and/or deployment service may, using the protocol (e.g., NETCONF, etc.) and/or one or more application layer services that handle the configuration, cause the network device to be implemented.

In this way, the service management platform uses machine learning to generate and provide the user device with a recommendation of a network service configuration. This conserves resources (e.g., processing resources, network resources, memory resources, and/or the like) that would otherwise be wasted implementing an ineffective network service configuration (e.g., a network service configuration that does not adequately satisfy needs of a client organization), resources that would be wasted trying to support network traffic using aspects of the ineffective network service configuration, resources that would be wasted resolving network issues created by the ineffective network service configuration, and/or the like. Additionally, or alternatively, the service management platform is able to automatically implement the network service configuration, thereby eliminating or reducing chances of human error while improving speed and efficiency of the process.

As indicated above, FIGS. 1A-1E are provided merely as examples. Other examples may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) of example implementation(s) 100 may perform one or more functions described as being performed by another set of devices of example implementation(s) 100.

Figure 2:
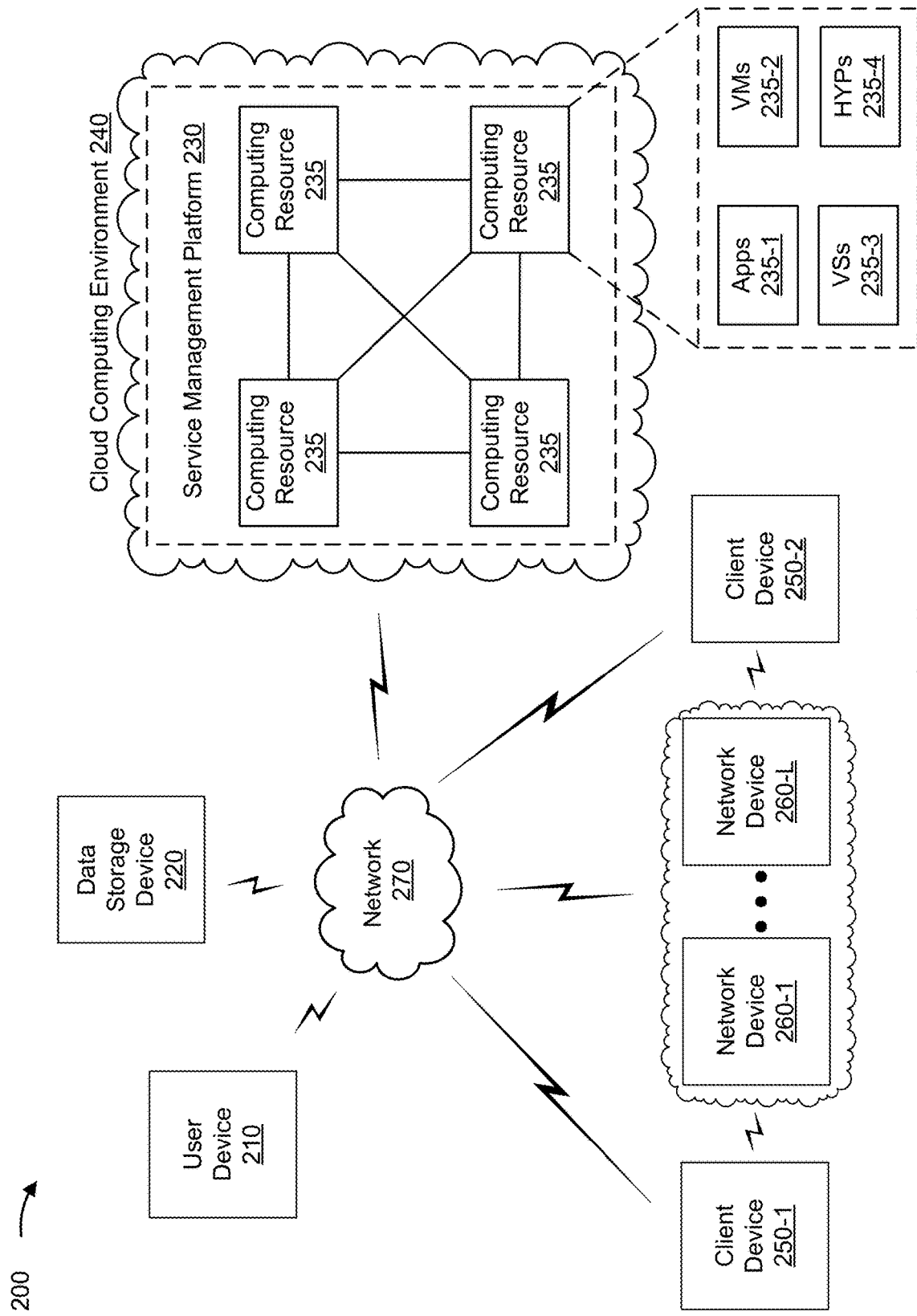
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data storage device 220, a service management platform hosted within a cloud computing environment 240, a group of client devices 250 (shown as Client Device 1 and Client Device 2), a group of network devices 260 (shown as Network Device 1 through Network Device L), and/or a network 270. Devices of environment 200 may interconnect via wired connections, wireless connections, or a combination of wired and wireless connections.

User device 210 includes one or more devices capable of receiving, generating, storing, processing, and/or providing information associated with a network service configuration. For example, user device 210 may include a device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device.

In some implementations, user device 210 may support or have access to an application that may be used to create network service configurations. In some implementations, user device 210 may provide data included in a service request, data identifying a network service configuration, and/or outcome data to data storage device 220. In some implementations, user device 210 may receive a service request. In some implementations, user device 210 may provide, to service management platform 230, a request for a recommended network service configuration. In some implementations, user device 210 may receive, from service management platform 230, data identifying a network service configuration that is being recommended.

Data storage device 220 includes one or more devices capable of receiving, storing, generating, determining, and/or providing information associated with a set of network service configurations. For example, data storage device 220 may include a server device or a group of server devices. In some implementations, data storage device 220 may receive data included in a service request for a network service configuration, data identifying a network service configuration, outcome data, and/or telemetry data. This data may be received from user device 210, client device 250, network device 260, and/or a similar type of device. In some implementations, this data may be stored as training data and may be provided to service management platform 230.

Service management platform 230 includes one or more devices capable of receiving, storing, processing, determining, and/or providing information associated with a network service configuration. For example, service management platform 230 may include a server device (e.g., a host server, a web server, an application server, etc.), a data center device, or a similar device. In some implementations, service management platform 230 may support one or more features of an application that can be used to create network service configurations. In some implementations, the application may be updated with a new version, a plugin, and/or the like, that allows the application to receive and process requests for network service configurations. In some implementations, one or more embodiments, tasks, processes, and/or the like, that are described herein as being performed by service management platform 230, may be performed by another device, such as user device 210, client device 250, network device 260, and/or the like.

In some implementations, as shown, service management platform 230 may be hosted in cloud computing environment 240. Notably, while implementations described herein describe service management platform 230 as being hosted in cloud computing environment 240, in some implementations, service management platform 230 may not be cloud-based (i.e., may be implemented outside of a cloud computing environment) or may be partially cloud-based.

Cloud computing environment 240 includes an environment that hosts service management platform 230. Cloud computing environment 240 may provide computation, software, data access, storage, etc. services that do not require end-user knowledge of a physical location and configuration of system(s) and/or device(s) that hosts service management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device.

In some implementations, computing resource 235 may host service management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, data storage device 220, one or more client devices 250, and/or one or more network devices 260. Application 235-1 may eliminate a need to install and execute the software applications on these devices. In some implementations, one application 235-1 may send/receive information to/from one or more other applications 235-1, via virtual machine 235-2. In some implementations, application 235-1 may include the application that is used to create network service configurations.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, one or more client devices 250, and/or one or more network devices 260), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems.

Client device 250 includes one or more devices capable of receiving, processing and/or providing network traffic in a manner described herein. For example, client device 250 may include a computing and/or communication device (e.g., a desktop computer, a laptop computer, a mobile phone, etc.), a traffic transfer device, such as a router, a gateway, a switch, a firewall, a hub, a bridge, a reverse proxy, a server (e.g., a proxy server, a server executing a virtual machine, etc.), a load balancer, and/or a similar type of device. Additionally, or alternatively, client device 250 may include an endpoint device that is a source or a destination for network traffic. For example, client device 250 may include a computer, a server device, a mobile device, and/or a similar type of device. In some implementations, client device 250 may receive packets associated with traffic flow of a session from other client devices 250 and/or may provide the packets to the other client devices 250 via network 270 (e.g., by routing packets using network device(s) 220 as an intermediary). In some implementations, client device 250 may collect and/or report telemetry data to data storage device 220, service management platform 230, and/or network device 260.

Network device 260 includes one or more devices capable of receiving, processing, storing, routing, and/or providing traffic (e.g., a packet, a file, etc.) in a manner described herein. For example, network device 260 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 260 may include a gateway, a switch, a firewall, a hub, a bridge, a reverse proxy, a server (e.g., a proxy server, a cloud server, a data center server, etc.), a load balancer, and/or a similar device.

In some implementations, network device 260 may be a physical device implemented within a housing, such as a chassis. In some implementations, network device 260 may be a virtual device implemented by one or more computer devices of a cloud computing environment or a data center.

In some implementations, network device 260 may collect and/or provide telemetry data to data storage device 220 and/or service management platform 230. In some implementations, network device 260 may support or have access to one or more network services and/or network service features described herein.

Network 270 includes one or more wired and/or wireless networks. For example, network 270 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
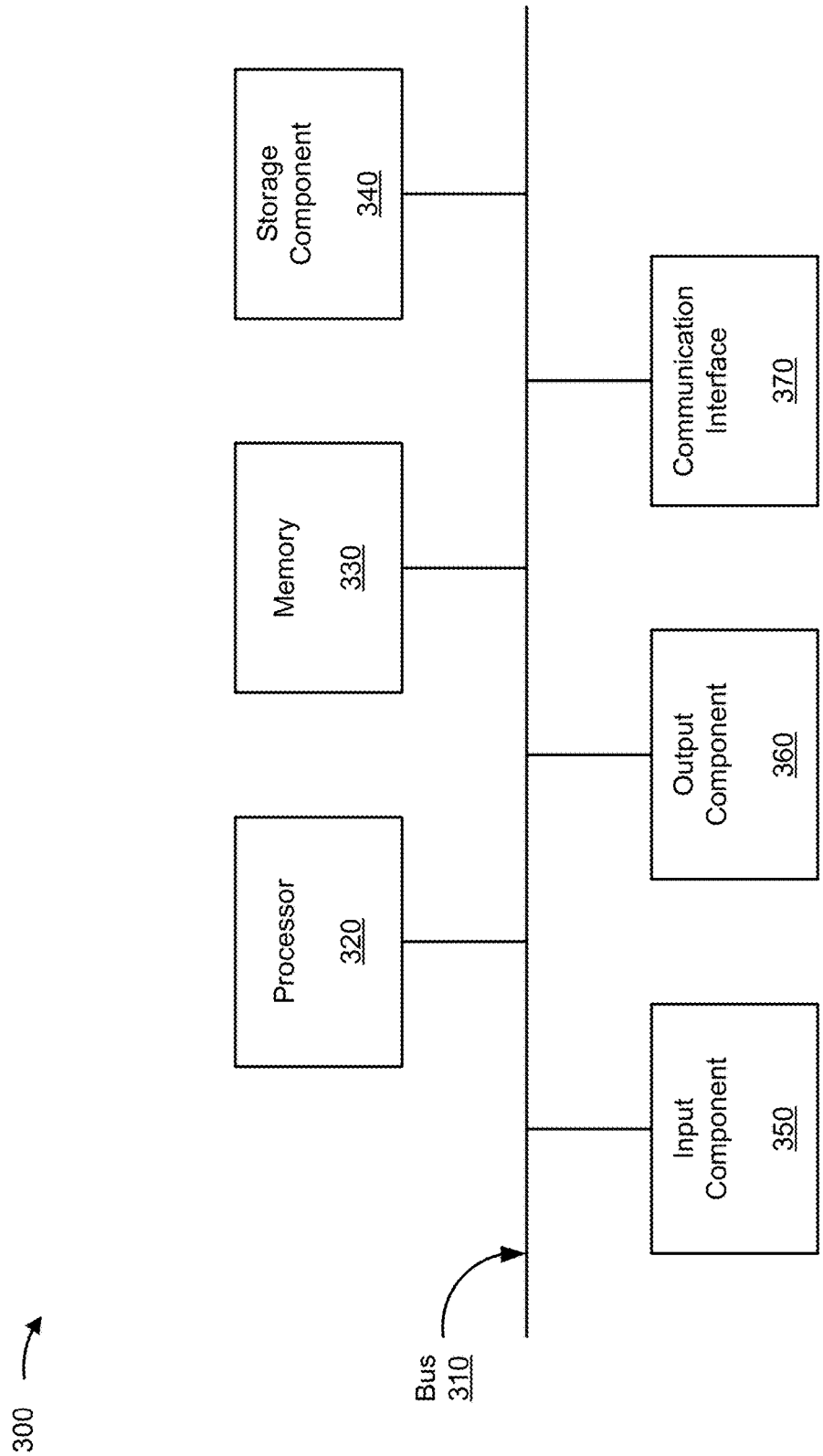
FIG. 3 is a diagram of example components of one or more devices of FIG. 2.

FIG. 3 is a diagram of example components of a device 300. Device 300 may correspond to user device 210, data storage device 220, service management platform 230, one or more client devices 250, and/or one or more network devices 260. In some implementations, user device 210, data storage device 220, service management platform 230, one or more client devices 250, and/or one or more network devices 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
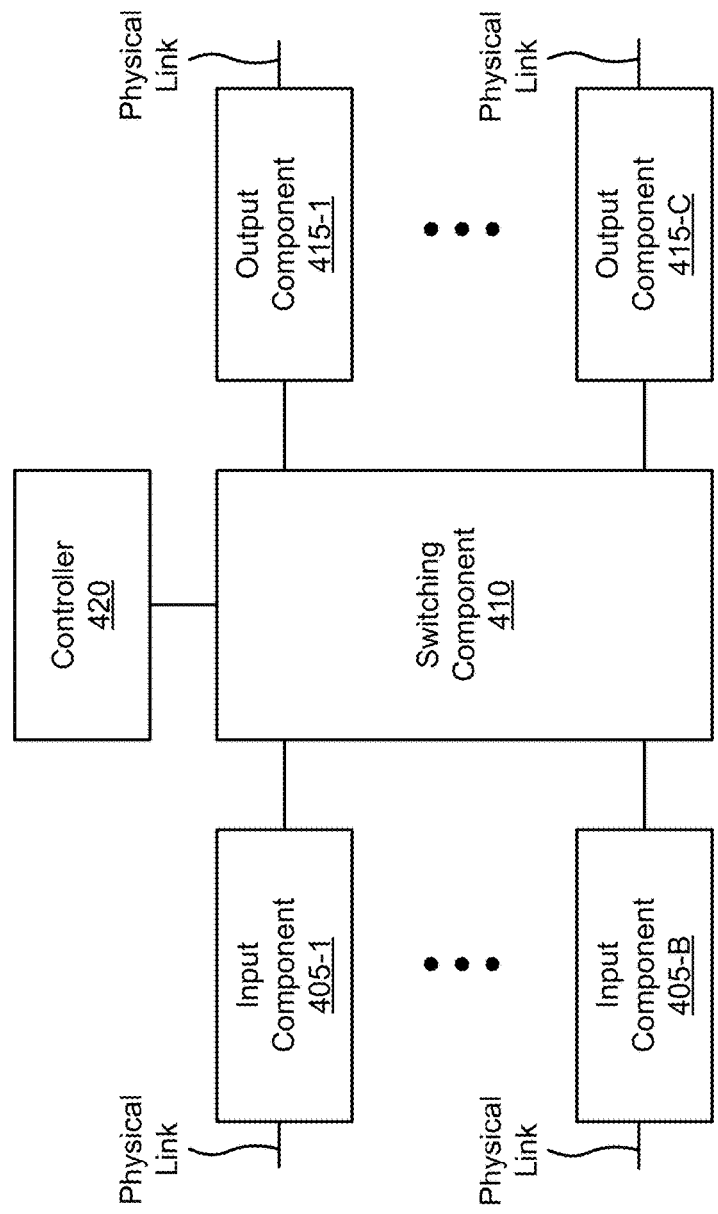
FIG. 4 is a diagram of example components of one or more devices of FIG. 2.

FIG. 4 is a diagram of example components of a device 400. Device 400 may correspond to one or more client devices 250 and/or one or more network devices 260. In some implementations, the one or more client devices 250 and/or the one or more network devices 260 may include one or more devices 400 and/or one or more components of device 400. As shown in FIG. 4, device 400 may include one or more input components 405-1 through 405-B (B>1) (hereinafter referred to collectively as input components 405, and individually as input component 405), a switching component 410, one or more output components 415-1 through 415-C (C>1) (hereinafter referred to collectively as output components 415, and individually as output component 415), and a controller 420.

Input component 405 may be points of attachment for physical links and may be points of entry for incoming traffic, such as packets. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 405.

Switching component 410 may interconnect input components 405 with output components 415. In some implementations, switching component 410 may be implemented via one or more crossbars, via busses, and/or with shared memories. The shared memories may act as temporary buffers to store packets from input components 405 before the packets are eventually scheduled for delivery to output components 415. In some implementations, switching component 410 may enable input components 405, output components 415, and/or controller 420 to communicate.

Output component 415 may store packets and may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 415. In some implementations, input component 405 and output component 415 may be implemented by the same set of components (e.g., and input/output component may be a combination of input component 405 and output component 415).

Controller 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, or a combination of software and hardware. In some implementations, controller 420 may include one or more processors that can be programmed to perform a function.

In some implementations, controller 420 may include a random access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create routing tables based on the network topology information, create forwarding tables based on the routing tables, and forward the forwarding tables to input components 405 and/or output components 415. Input components 405 and/or output components 415 may use the forwarding tables to perform route lookups for incoming and/or outgoing packets. In some cases, controller 420 may create a session table based on information determined while initializing a link fault detection (e.g., BFD) session, and may forward the session table to input components 405 and/or output components 415.

Controller 420 may perform one or more processes described herein. Controller 420 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 420 from another computer-readable medium or from another device via a communication interface. When executed, software instructions stored in a memory and/or storage component associated with controller 420 may cause controller 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a diagram of an example network service configuration 500. Example network service configuration 500 may include a set of network services and a set of network services features. In some implementations, the set of network services and/or the set of network service features may perform tasks associated with different layers of an open system interconnection (OSI) model. For example, the set of network services and/or the set of network service features may perform tasks associated with a physical layer (layer 1), a data link layer (layer 2), a network layer (layer 3), a transport layer (layer 4), a session layer (layer 5), a presentation layer (layer 6), and/or an application layer (layer 7).

As shown by example network service configuration 500, network services and/or network service features may perform tasks associated with layer 2, layer 3, layer 4, and layer 7. For example, and as shown by the first two boxes in example network service configuration 500, a packet policing service, a packet filtering service, a stateful firewall (FW) service, a network address translation (NAT) service, a SYN proxy service, a firewall authentication service, a service to protect against a distributed denial-of-service (DDoS) attack, a user firewall service, and/or a unified access control service, may, at an ingress portion of a network device, perform tasks associated with layers 2-4.

As another example, and as shown by the third box in example network service configuration 500, an application identification service, a user firewall service, a security intelligence/Geolocation IP service, and/or a security intelligence/command & control (C&C) service, may perform classification tasks associated with layers 3 and 4. As another example, and as shown by the fourth box in example network service configuration 500, a transmission control protocol (TCP) termination service, a transport layer security (TLS) termination service, an hypertext transfer protocol (HTTP) termination service, and/or a network proxy termination service (e.g., SOCKS), may perform proxy termination tasks associated with one or more layers of the OCI model.

As another example, and as shown by the fifth box in example network service configuration 500, a protocol and application parser service, an application identification service, and/or an application tracking service, may perform classification tasks associated with layer 7. As another example, and as shown by the sixth box in example network service configuration 500, an application firewall service, a uniform resource locator (URL) filtering service, a captive portal unified access control (UAC) service, may perform access control tasks associated with layer 7.

As another example, and as shown by the seventh box in example network service configuration 500, a security intelligence C&C service, an intrusion prevention service, and/or an anti-spam service may perform threat prevention tasks associated with layer 7. As another example, and as shown by the eighth box in example network service configuration 500, a content filtering service, an anti-virus service, and/or an anti-malware service may perform content threat prevention tasks associated with layer 7.

As another example, and as shown by the ninth box in example network service configuration 500, a URL rewrite service, a data leak prevention (DLP) service, and/or an application layer gateway (ALG) service, may perform content rewrite tasks associated with one or more layers of the OCI model. As another example, and as shown by the tenth box in example network service configuration 500, a TCP initiation service, a TLS initiation service, an HTTP initiation service, and/or a network proxy service (e.g., SOCKS), may perform proxy initiation tasks associated with one or more layers of the OCI model.

As another example, and as shown by the eleventh box in example network service configuration 500, an application quality of service (QoS) service, a NAT service, and/or a stateful firewall service, may, at an egress side of a network device, perform tasks associated with layers 3 and 4. As another example, and as shown by the twelfth box in example network service configuration 500, an egress shaping (CQs) service and/or a routing service may perform shaping and forwarding tasks associated with layers 3 and 4.

Example network service configuration 500 is provided to illustrate the complexity that goes in creating network service configurations. Further to this point, example network service configuration 500 excludes all network service features. For example, one or more of the 41 network services described in example network service configuration 500 may also include any number of configurable network service features.

The number and arrangement of network services and/or network service features shown in FIG. 5 are provided as an example. In practice, example network service configuration 500 may include additional network services and/or network service features, fewer network services and/or network service features, different network services and/or network service features, or differently arranged network services and/or network service features than those shown in FIG. 5.

Figure 6:
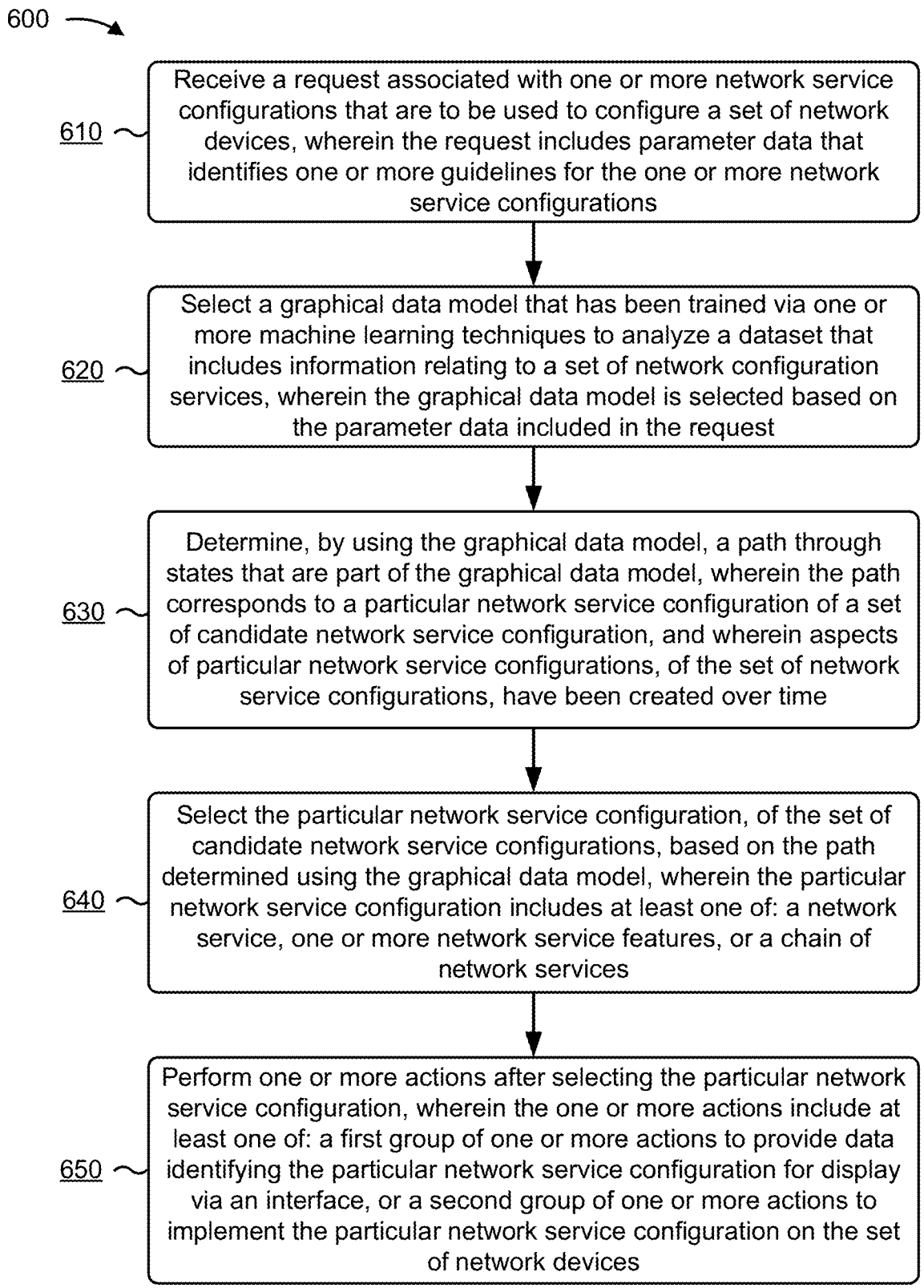
FIGS. 6-8 are flow charts of an example process for using machine learning to generate a recommendation of a network service configuration.

FIG. 6 is a flow chart of an example process 600 for using machine learning to generate a recommendation of a network service configuration. In some implementations, one or more process blocks of FIG. 6 may be performed by a service management platform (e.g., service management platform 230). In some implementations, one or more process blocks of FIG. 6 may be performed by another device or a group of devices separate from or including the service management platform, such as a user device (e.g., user device 210), a data storage device (e.g., data storage device 220), a client device (e.g., client device 250), and/or a network device (e.g., network device 260).

As shown in FIG. 6, process 600 may include receiving a request associated with one or more network service configurations that are to be used to configure a set of network devices, wherein the request includes parameter data that identifies one or more guidelines for the one or more network service configurations (block 610). For example, the service management platform (e.g., using computing resource 235, processor 320, memory 330, storage component 340, input component 350, communication interface 370, and/or the like) may receive a request associated with one or more network service configurations that are to be used to configure a set of network devices (e.g., a set of network devices 260), as described above. In some implementations, the request may include parameter data that identifies one or more guidelines for the one or more network service configurations. In some implementations, the request may be a request for one or more new network service configurations. Additionally, or alternatively, the request may be a request to modify one or more existing network service configurations.

As further shown in FIG. 6, process 600 may include selecting a graphical data model that has been trained via one or more machine learning techniques to analyze a dataset that includes information relating to a set of network configuration services, wherein the graphical data model is selected based on the parameter data included in the request, and wherein aspects of particular network service configurations, of the set of network service configurations, have been created over time (block 620). For example, the service management platform (e.g., using computing resource 235, processor 320, memory 330, storage component 340, communication interface 370, and/or the like) may select a graphical data model that has been trained via one or more machine learning techniques to analyze a dataset that includes information relating to a set of network configuration services, as described above. In some implementations, the graphical data model may be selected based on the parameter data included in the request. For example, the graphical data model may be selected, from a set of possible graphical data models, based on the parameter data included in the request.

In some implementations, aspects of particular network service configurations, of the set of network service configurations, may have been created over time. An aspect of a network service configuration, as used herein, may include a network service that is part of the network service configuration and/or a network service feature that is part of the network service configuration. For example, if a network service configuration includes ten network services, each of the ten network services may be an aspect of the network service configuration. Additionally, in some cases, each aspect may have been created over time. For example, three of the ten network services may have been created at a first time period, another five of the network services may have been created at a second time period (such that the particular network service configuration would now include eight network services), and another two of the network services may have been created at a third time period (such that the particular network service configuration would now include ten network services).

As further shown in FIG. 6, process 600 may include determining, by using the graphical data model, a path through states that are part of the graphical data model, wherein the path corresponds to a particular network service configuration of a set of candidate network service configurations (block 630). For example, the service management platform (e.g., using computing resource 235, processor 320, memory 330, storage component 340, communication interface 370, and/or the like) may determine, by using a graphical data model, a path through states that are part of the graphical data model, as described above. In some implementations, the path may correspond to a particular network service configuration of a set of candidate network service configurations.

As further shown in FIG. 6, process 600 may include selecting the particular network service configuration, of the set of candidate network service configurations, based on the path determined using the graphical data model, wherein the particular network service configuration includes at least one of: a network service, one or more network service features, or a chain of network services (block 640). For example, the service management platform (e.g., using computing resource 235, processor 320, memory 330, storage component 340, communication interface 370, and/or the like) may select the particular network service configuration, of the set of candidate network service configurations, based on the path determined using the graphical data model, as described above. In some implementations, the particular network service configuration may include at least one of: a network service, one or more network service features, or a chain of network services.

As further shown in FIG. 6, process 600 may include performing one or more actions after selecting the particular network service configuration, wherein the one or more actions include at least one of: a first group of one or more actions to provide data identifying the particular network service configuration for display via an interface, or a second group of one or more actions to implement the particular network service configuration on the set of network devices (block 650). For example, the service management platform (e.g., using computing resource 235, processor 320, memory 330, storage component 340, input component 350, output component 360, communication interface 370, and/or the like) may perform one or more actions after selecting the particular network service configuration, as described above. In some implementations, the one or more actions may include at least one of: a first group of one or more actions to provide data identifying the particular network service configuration for display via an interface, or a second group of one or more actions to implement the particular network service configuration on the set of network devices.

Process 600 may include additional implementations, such as any single implementation or any combination of implementations described below and/or in connection with one or more other processes described elsewhere herein.

In some implementations, the graphical data model may be a Hidden Markov Model (HMM). In some implementations, the service management platform may obtain, before receiving the request, the dataset that includes the information relating to the set of network service configurations. The information may include outcome data, or telemetry data. In some implementations, the service management platform may analyze the dataset to identify a set of observations that have occurred in a particular sequence. In some implementations, the service management platform may determine, by performing a Viterbi analysis, a best-fit path that includes a particular sequence of states through the HMM, wherein the best-fit path is determined based on a particular sequence of observations, and wherein the best-fit path includes states that represent one or more of the set of network service configurations at one or more respective time periods.

In some implementations, the graphical data model may be a Hidden Markov Model (HMM). In some implementations, the service management platform may obtain, before receiving the request, the dataset that includes the information relating to the set of network service configurations. The information may include data identifying the set of network service configurations, outcome data, or telemetry data. In some implementations, the service management platform may analyze the dataset to identify a set of observations that have occurred in a particular sequence. In some implementations, the service management platform may generate a set of states based on the data identifying the set of network service configurations. In some implementations, the service management platform may generate a set of model parameters for the HMM. In some implementations, the service management platform may update the HMM by performing the Viterbi analysis to determine a best-fit path that represents a state sequence. The best-fit path may be based a particular sequence of observations. The best-fit path may include states that represent one or more of the set of network service configurations at one or more respective time periods.

In some implementations, when selecting the particular network service configuration, the service management platform may select the chain of network services, where the chain of network services is an ordered combination of network services, and may select the one or more network service features for at least one of the network services included in the chain. In some implementations, network services that are part of the set of candidate network service configurations may include at least one of a packet filtering service, a packet translation service, an authentication service, a classification service, a security service, a proxy service, a content filtering service, or a packet forwarding service.

In some implementations, the service management platform may determine, for the path, a confidence score that represents a likelihood of the particular network service configuration satisfying the request. In some implementations, the service management platform may determine whether the confidence score satisfies a threshold confidence score. In some implementations, the service management platform may perform the first group of one or more actions or the second group of one or more actions based on whether the confidence score satisfies the threshold confidence score.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
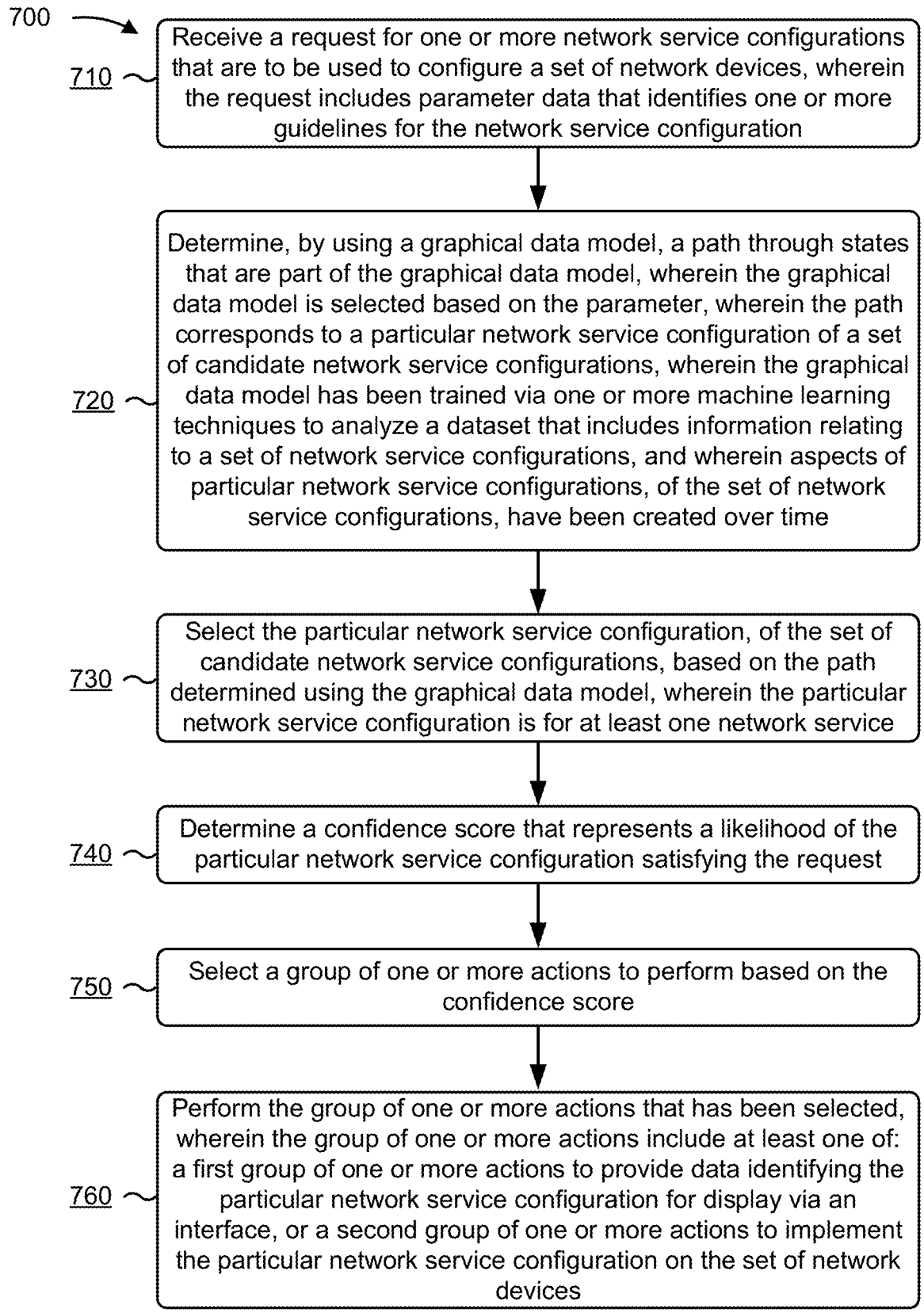

FIG. 7 is a flow chart of an example process 700 for using machine learning to generate a recommendation of a network service configuration. In some implementations, one or more process blocks of FIG. 7 may be performed by a service management platform (e.g., service management platform 230). In some implementations, one or more process blocks of FIG. 7 may be performed by another device or a group of devices separate from or including the service management platform, such as a user device (e.g., user device 210), a data storage device (e.g., data storage device 220), a client device (e.g., client device 250), and/or a network device (e.g., network device 260).

As shown in FIG. 7, process 700 may include receiving a request for one or more network service configurations that are to be used to configure a set of network devices, wherein the request includes parameter data that identifies one or more guidelines for the network service configuration (block 710). For example, the service management platform (e.g., using computing resource 235, processor 320, memory 330, storage component 340, input component 350, communication interface 370, and/or the like) may receive a request for one or more network service configurations that are to be used to configure a set of network devices, as described above. In some implementations, the request includes parameter data that identifies one or more guidelines for the network service configuration.

As further shown in FIG. 7, process 700 may include determining, by using a graphical data model, a path through states that are part of the graphical data model, wherein the graphical data model is selected based on the parameter data, wherein the path corresponds to a particular network service configuration of a set of candidate network service configurations, and wherein the graphical data model has been trained via one or more machine learning techniques to analyze a dataset that includes information relating to a set of network service configurations (block 720). For example, the service management platform (e.g., using computing resource 235, processor 320, memory 330, storage component 340, communication interface 370, and/or the like) may determine, by using a graphical data model to analyze the parameter data, a path through states that are part of the graphical data model, as described above. In some implementations, the graphical data model may be selected based on the parameter data. In some implementations, the path may correspond to a particular network service configuration of a set of candidate network service configurations, and the graphical data model may have been trained via one or more machine learning techniques to analyze a dataset that includes information relating to a set of network service configurations.

As further shown in FIG. 7, process 700 may include selecting the particular network service configuration, of the set of candidate network service configurations, based on the path determined using the graphical data model, wherein the particular network service configuration is for at least one network service (block 730). For example, the service management platform (e.g., using computing resource 235, processor 320, memory 330, storage component 340, communication interface 370, and/or the like) may select the particular network service configuration, of the set of candidate network service configurations, based on the path determined using the graphical data model, as described above. In some implementations, the particular network service configuration may be for at least one network service.

As further shown in FIG. 7, process 700 may include determining a confidence score that represents a likelihood of the particular network service configuration satisfying the request (block 740). For example, the service management platform (e.g., using computing resource 235, processor 320, memory 330, storage component 340, and/or the like) may determine a confidence score that represents a likelihood of the particular network service configuration satisfying the request, as described above.

As further shown in FIG. 7, process 700 may include selecting a group of one or more actions to perform based on the confidence score (block 750). For example, the service management platform (e.g., using computing resource 235, processor 320, memory 330, storage component 340, and/or the like) may select a group of one or more actions to perform based on the confidence score, as described above.

As further shown in FIG. 7, process 700 may include performing the group of one or more actions that has been selected, wherein the group of one or more actions include at least one of: a first group of one or more actions to provide data identifying the particular network service configuration for display via an interface, or a second group of one or more actions to implement the particular network service configuration on the set of network devices (block 760). For example, the service management platform (e.g., using computing resource 235, processor 320, memory 330, storage component 340, input component 350, output component 360, communication interface 370, and/or the like) may perform the group of one or more actions that has been selected, as described above. In some implementations, the group of one or more actions may include at least one of: a first group of one or more actions to provide data identifying the particular network service configuration for display via an interface, or a second group of one or more actions to implement the particular network service configuration on the set of network devices.

Process 700 may include additional implementations, such as any single implementation or any combination of implementations described below and/or in connection with one or more other processes described elsewhere herein.

In some implementations, the graphical data model may be a Hidden Markov Model (HMM) and may have been trained using: a set of states that identify particular network services or particular network service features that were created, updated, deleted, or implemented, at particular time periods, a set of observations that have occurred in a particular sequence, a set of initial state probabilities, and a set of emission probabilities. In some implementations, the information relating to the set of network service configurations may include data identifying the set of network service configurations, outcome data that includes data identifying a manner in which the set of network service configurations were used, and/or telemetry data that identifies events caused by network traffic that was sent via the set of network devices that were implementing the set of network service configurations.

In some implementations, the service management platform may obtain, before receiving the request, the dataset describing the information relating to the set of network service configurations, where the dataset includes telemetry data that identifies events caused by network traffic that was sent via the set of network devices that were implementing the set of network service configurations. In some implementations, the service management platform may analyze the dataset to identify a set of observations that have occurred in a particular sequence. In some implementations, the service management platform may generate values that represent the states of the graphical data model. In some implementations, the service management platform may generate a set of model parameters for the graphical data model. In some implementations, the service management platform may update the HMM to determine a best-fit path that represents a state sequence. A particular path through the set of states may be identified as a best-fit path based on a particular sequence of observations.

In some implementations, the graphical data model may be a Hidden Markov Model (HMM). In some implementations, when determining the path, the service management platform may perform a Viterbi analysis to determine the path through the states. The path may represent a sequence of one or more states and is determined based on a given sequence of observations. In some implementations, when selecting the particular network service configuration, the service management platform may select the chain of network services, and may select one or more network service features for at least one of the network services included in the chain. In some implementations, network services that are part of the set of candidate network service configurations may include a packet filtering service, a packet translation service, an authentication service, a classification service, a security service, a proxy service, a content filtering service, and/or a packet forwarding service.

In some implementations, when receiving the request, the service management platform may receive, as the request, a particular request for multiple network service configurations. Additionally, when performing the one or more actions, the service management platform may perform the first group of one or more actions to provide the data identifying the particular network service configuration for display via the interface to permit a user to select the particular network service configuration as one of the multiple network service configurations. Selection of the particular network service configuration or a different network service configuration may cause a new request for another network service configuration, of the multiple network service configurations, to be provided to the device.

Further to the above example, the request may effectively allow a user to ask for a recommendation for a first network service or a first network service feature, and, after receiving the recommendation (and accepting or rejecting the recommendation), may receive another recommendation for a second network service or a second network service feature.

This process may continue until the user has received recommendations for a combination of network services and/or network service features that may serve as a complete network service configuration.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
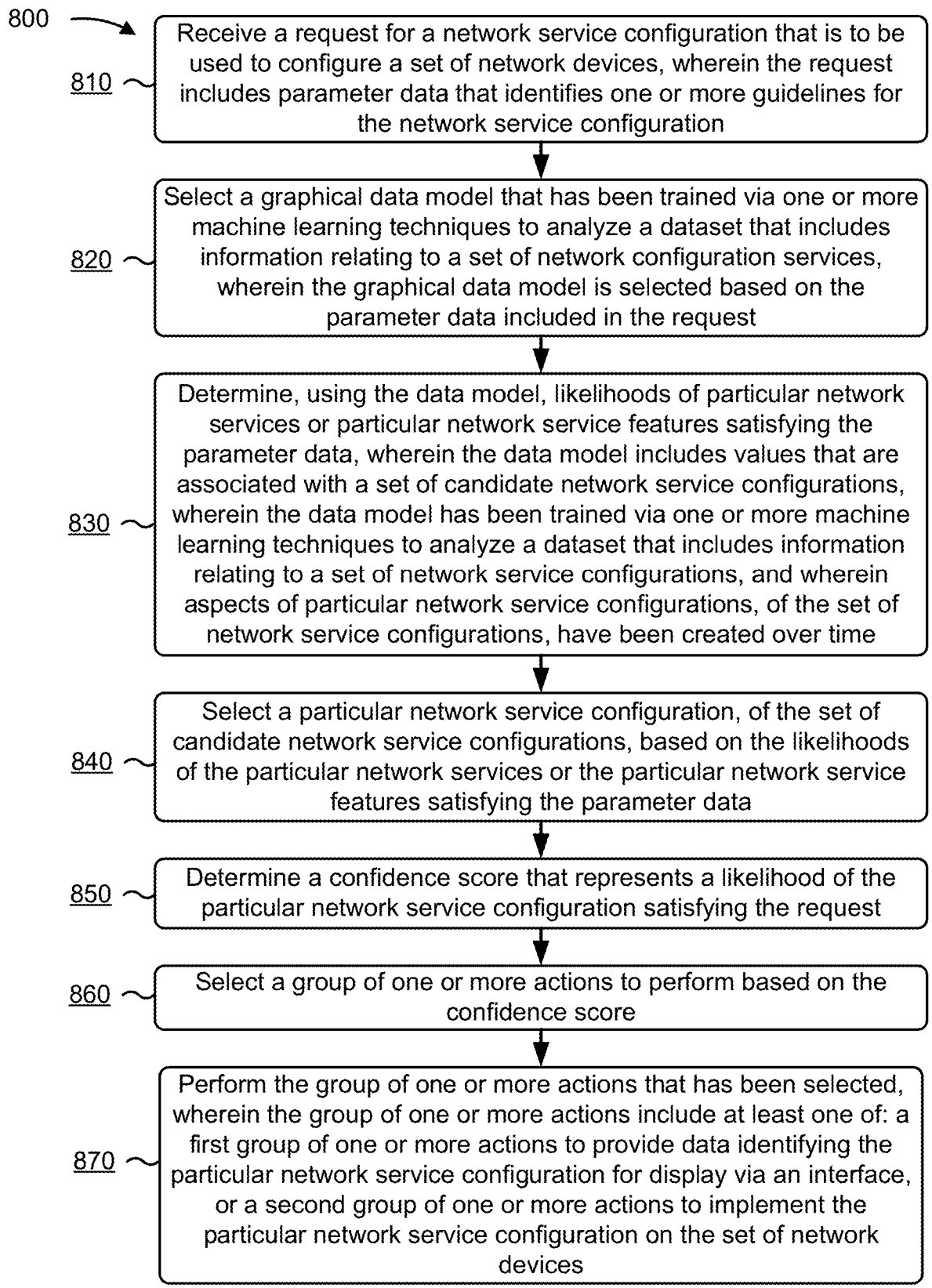

FIG. 8 is a flow chart of an example process 800 for using machine learning to generate a recommendation of a network service configuration. In some implementations, one or more process blocks of FIG. 8 may be performed by a service management platform (e.g., service management platform 230). In some implementations, one or more process blocks of FIG. 8 may be performed by another device or a group of devices separate from or including the service management platform, such as a user device (e.g., user device 210), a data storage device (e.g., data storage device 220), a client device (e.g., client device 250), and/or a network device (e.g., network device 260).

As shown in FIG. 8, process 800 may include receiving a request for a network service configuration that is to be used to configure a set of network devices, wherein the request includes parameter data that identifies one or more guidelines for the network service configuration (block 810). For example, the service management platform (e.g., using computing resource 235, processor 320, memory 330, storage component 340, input component 350, communication interface 370, and/or the like) may receive a request for a network service configuration that is to be used to configure a set of network devices, as described above. In some implementations, the request includes parameter data that identifies one or more guidelines for the network service configuration.

As further shown in FIG. 8, process 800 may include selecting a data model that has been trained via one or more machine learning techniques to analyze a dataset that includes information relating to a set of network configuration services, wherein the data model is selected based on the parameter data included in the request (block 820). For example, the service management platform (e.g., using computing resource 235, processor 320, memory 330, storage component 340, communication interface 370, and/or the like) may select a data model that has been trained via one or more machine learning techniques to analyze a dataset that includes information relating to a set of network configuration services, as described above. In some implementations, the data model may be selected based on the parameter data included in the request.

As further shown in FIG. 8, process 800 may include determining, using a data model, likelihoods of particular network services or particular network service features satisfying the parameter data, wherein the data model includes values that are associated with a set of candidate network service configurations, and wherein the data model has been trained via one or more machine learning techniques to analyze a dataset that includes information relating to a set of network service configurations (block 830). For example, the service management platform (e.g., using computing resource 235, processor 320, memory 330, storage component 340, communication interface 370, and/or the like) may determine, using a data model, likelihoods of particular network services or particular network service features satisfying the parameter data, as described above. In some implementations, the data model may have been trained via one or more machine learning techniques to analyze a dataset that includes information relating to a set of network service configurations. In some implementations, the data model may include values that are associated with a set of candidate network service configurations.

As further shown in FIG. 8, process 800 may include selecting a particular network service configuration, of the set of candidate network service configurations, based on the likelihoods of the particular network services or the particular network service features satisfying the parameter data (block 840). For example, the service management platform (e.g., using computing resource 235, processor 320, memory 330, storage component 340, communication interface 370, and/or the like) may select a particular network service configuration, of the set of candidate network service configurations, based on the likelihoods of the particular network services or the particular network service features satisfying the request, as described above.

As further shown in FIG. 8, process 800 may include determining a confidence score that represents a likelihood of the particular network service configuration satisfying the request (block 850). For example, the service management platform (e.g., using computing resource 235, processor 320, memory 330, storage component 340, and/or the like) may determine a confidence score that represents a likelihood of the particular network service configuration satisfying the request, as described above.

As further shown in FIG. 8, process 800 may include selecting a group of one or more actions to perform based on the confidence score (block 860). For example, the service management platform (e.g., using computing resource 235, processor 320, memory 330, storage component 340, and/or the like) may select a group of one or more actions to perform based on the confidence score, as described above.

As further shown in FIG. 8, process 800 may include performing the group of one or more actions that has been selected, wherein the group of one or more actions include at least one of: a first group of one or more actions to provide data identifying the particular network service configuration for display via an interface, or a second group of one or more actions to implement the particular network service configuration on the set of network devices (block 870). For example, the service management platform (e.g., using computing resource 235, processor 320, memory 330, storage component 340, input component 350, output component 360, communication interface 370, and/or the like) may perform the group of one or more actions that has been selected, as described above. In some implementations, the group of one or more actions may include at least one of: a first group of one or more actions to provide data identifying the particular network service configuration for display via an interface, or a second group of one or more actions to implement the particular network service configuration on the set of network devices.

Process 800 may include additional implementations, such as any single implementation or any combination of implementations described below and/or in connection with one or more other processes described elsewhere herein.

In some implementations, when selecting the particular network service configuration, the service management platform may select a chain of network services as the particular network service configuration. The chain of network services may include two or more network services, and a set of network service features for at least one of the two or more network services.

In some implementations, the data model may be a graphical data model, and the service management platform may receive, before receiving the request, the graphical data model. Each state may represent a respective network service, or a respective network service feature, that had been created, updated, deleted, or implemented, at a particular time period. The data model may have been trained to determine, based on a set of observations, a best-fit path through a set of states.

In some implementations, the dataset that includes the information relating to the set of network service configurations may include data included in service requests for the set of network service configurations, data identifying the set of network service configurations, outcome data that includes data identifying a manner in which the set of network service configurations were used, and/or telemetry data that identifies events caused by network traffic that was sent via the set of network devices that were implementing the set of network service configurations. The data identifying the set of network service configurations may exclude information that indicates times at which particular network services or particular network service features were created, updated, deleted, or implemented.

In some implementations, network services that are part of the set of candidate network service configurations may include at least one of: a packet filtering service, a packet translation service, an authentication service, a classification service, a security service, a proxy service, a content filtering service, or a packet forwarding service. In some implementations, when performing the group of one or more actions, the service management platform may provide, after selecting the second group of one or more actions, the set of network devices with a set of instructions for the particular network service configuration to cause the set of network devices to use the set of instructions to implement the particular network service configuration.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As used herein, the term network traffic, traffic flow, or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    training, by a device, a set of graphical data models using one or more machine learning techniques to analyze a training dataset that includes information relating to a set of network service configurations,
        wherein training the set of graphical data models comprises:
            generating values that represent a set of states, and a set of model parameters, and
            updating, while executing the set of graphical data models one or more times, the set of model parameters;
    receiving, by the device, a request associated with one or more network service configurations, from the set of network service configurations, that are to be used to configure a set of network devices, wherein the request includes parameter data that identifies one or more guidelines for the one or more network service configurations;
selecting, by the device, a Hidden Markov Model (HMM) from the set of graphical data models,
wherein the HMM is selected based on the parameter data included in the request, and
wherein aspects of particular network service configurations, of the set of network service configurations, have been created over time;
determining, by the device and by using the HMM, a path through states that are part of the HMM,
wherein the path corresponds to a particular network service configuration of a set of candidate network service configurations;
selecting, by the device, the particular network service configuration, of the set of candidate network service configurations, based on the path determined using the HMM,
wherein the particular network service configuration includes at least one of:
a network service,
one or more network service features, or
a chain of network services; and
performing, by the device, one or more actions after selecting the particular network service configuration,
wherein the one or more actions include at least one of:
a first group of one or more actions to provide data identifying the particular network service configuration for display via an interface, or
a second group of one or more actions to implement the particular network service configuration on the set of network devices.

2. The method of claim 1, wherein the graphical data model ii a Hidden Markov Model (HMM); and
wherein the updating the set of model parameters comprises:
updating the set of model parameters until a set of convergence criteria is satisfied, wherein a particular path through the set of states is identified as a best-fit path based on the set of convergence criteria being satisfied,
wherein the best-fit path is based on a particular sequence of observations, and
wherein the best-fit path includes states that represent one or more of the set of network service configurations at one or more respective time periods.

3. The method of claim 1, further comprising:
determining, by performing a Viterbi analysis, a best-fit path that includes a particular sequence of states through the HMM,
wherein the best-fit path is determined based on a particular sequence of observations, and
wherein the best-fit path includes states that represent one or more of the set of network service configurations at one or more respective time periods.

4. The method of claim 1, wherein the HMM has been trained using the set of states that identify particular network services or particular network service features that were created, updated, deleted, or implemented, at particular time periods.

5. The method of claim 1, wherein selecting the particular network service configuration comprises:
selecting the chain of network services,
wherein the chain of network services is an ordered combination of network services, and
selecting the one or more network service features for at least one of the network services included in the chain.

6. The method of claim 1, wherein network services that are part of the set of candidate network service configurations and include at least one of:
a packet filtering service,
a packet translation service,
an authentication service,
a classification service,
a security service,
a proxy service,
a content filtering service, or
a packet forwarding service.

7. The method of claim 1, further comprising:
determining, for the path, a confidence score that represents a likelihood of the particular network service configuration satisfying the request;
determining whether the confidence score satisfies a threshold confidence score; and
wherein performing the one or more actions comprises:
performing the first group of one or more actions or the second group of one or more actions based on whether the confidence score satisfies the threshold confidence score.

8. A device, comprising:
one or more memories; and
one or more processors, to:
train a Hidden Markov Model (HMM) using one or more machine learning techniques to analyze a training dataset that includes information relating to a set of network service configurations,
wherein the one or more processors, when training the HMM, are to:
generate values that represent a set of states, and a set of model parameters, and
update, while executing HMM one or more times, the set of model parameters;
receive a request for one or more network service configurations, from the set of network service configurations, that are to be used to configure a set of network devices,
wherein the request includes parameter data that identifies one or more guidelines for the one or more network service configurations;
determine, by using the HMM, a path through states that are part of the HMM,
wherein the HMM is selected based on the parameter data,
wherein the path corresponds to a particular network service configuration of a set of candidate network service configurations, and
wherein aspects of particular network service configurations, of the set of network service configurations, have been created over time;
select the particular network service configuration, of the set of candidate network service configurations, based on the path determined using the HMM,
wherein the particular network service configuration is for at least one network service;
determine a confidence score that represents a likelihood of the particular network service configuration satisfying the request;
select a group of one or more actions to perform based on the confidence score; and
perform the group of one or more actions that has been selected, wherein the group of one or more actions include at least one of:
a first group of one or more actions to provide data identifying the particular network service configuration for display via an interface, or
a second group of one or more actions to implement the particular network service configuration on the set of network devices.

9. The device of claim 8, wherein the HMM has been trained using:
the set of states that identify particular network services or particular network service features that were created, updated, deleted, or implemented, at particular time periods,
a set of observations that have occurred in a particular sequence,
a set of initial state probabilities,
a set of state transition probabilities, and
a set of emission probabilities; and
wherein the information relating to the set of network service configurations includes at least one of:
data identifying the set of network service configurations,
outcome data that includes data identifying a manner in which the set of network service configurations were used, or
telemetry data that identifies events caused by network traffic that was sent via the set of network devices that were implementing the set of network service configurations.

10. The device of claim 8, wherein the one or more processors are further to:
obtain, before receiving the request, the training dataset describing the information relating to the set of network service configurations,
wherein the training dataset further includes telemetry data that identifies events caused by network traffic that was sent via the set of network devices that were implementing the set of network service configurations;
analyze the training dataset to identify a set of observations that have occurred in a particular sequence;
wherein the one or more processors, when generating values that represent the set of states and the set of model parameters, are to:
generate values that represent the states of the HMM, and
generate the set of model parameters for the HMM; and
wherein the one or more processors, when updating the set of model parameters, are to:
update the HMM to determine a best-fit path that represents a state sequence,
wherein a particular path through the set of states is identified as the best-fit path based on a particular sequence of observations.

11. The device of claim 8,
wherein the one or more processors, when determining the path, are to:
perform a Viterbi analysis to determine the path through the states,
wherein the path represents a sequence of one or more states and is determined based on a given sequence of observations.

12. The device of claim 8, wherein the one or more processors, when selecting the particular network service configuration, are to:
select a chain of network services, and
select one or more network service features for at least one of the network services included in the chain.

13. The device of claim 8, wherein network services that are part of the set of candidate network service configurations include at least one of:
a packet filtering service,
a packet translation service,
an authentication service,
a classification service,
a security service,
a proxy service,
a content filtering service, or
a packet forwarding service.

14. The device of claim 8, wherein the one or more processors, when receiving the request, are to:
receive, as the request, a particular request for multiple network service configurations; and
wherein the one or more processors, when performing the one or more actions, are to:
perform the first group of one or more actions to provide the data identifying the particular network service configuration for display via the interface to permit a user to select the particular network service configuration as one of the multiple network service configurations,
wherein selection of the particular network service configuration or a different network service configuration causes a new request for another network service configuration, of the multiple network service configurations, to be provided to the device.

15. A non-transitory computer-readable medium storing instructions, the instructions comprising:
one or more instructions that, when executed by one or more processors of a device, cause the one or more processors to:
train a set of graphical data models using one or more machine learning techniques to analyze a training dataset that includes information relating to a set of network service configurations,
wherein the one or more instructions, that cause the one or more processors to train the set of graphical data models, cause the one or more processors to:
generate values that represent a set of states, and a set of model parameters, and
update while executing the set of graphical data models one or more times, the set of model parameters;
receive a request for a network service configuration, from the set of network service configurations, that is to be used to configure a set of network devices,
wherein the request includes parameter data that identifies one or more guidelines for the network service configuration;
select a Hidden Markov Model (HMM) from the set of graphical data models,
wherein the HMM is selected based on the parameter data included in the request;
determine, using the HMM, likelihoods of particular network services or particular network service features satisfying the request, wherein the HMM includes values that are associated with a set of candidate network service configurations;

select a particular network service configuration, of the set of candidate network service configurations, based on the likelihoods of the particular network services or the particular network service features satisfying the request;

determine a confidence score that represents a likelihood of the particular network service configuration satisfying the request;

select a group of one or more actions to perform based on the confidence score; and perform the group of one or more actions that has been selected, wherein the group of one or more actions include at least one of:

a first group of one or more actions to provide data identifying the particular network service configuration for display via an interface, or a second group of one or more actions to implement the particular network service configuration on the set of network devices.

16. The non-transitory computer-readable medium of claim 15, wherein the one or more instructions, that cause the one or more processors to select the particular network service configuration, cause the one or more processors to:

select a chain of network services as the particular network service configuration, wherein the chain of network services includes:

two or more network services, and a set of network service features for at least one of the two or more network services.

17. The non-transitory computer-readable medium of claim 15, wherein the one or more instructions, when executed by the one or more processors, further cause the one or more processors to:

receive, before receiving the request, the HMM, wherein each state represents a respective network service, or a respective network service feature, that had been created, updated, deleted, or implemented, at a particular time period; and wherein the HMM has been trained to determine, based on a set of observations, a best-fit path through the set of states.

18. The non-transitory computer-readable medium of claim 15, wherein the training dataset that includes the information relating to the set of network service configurations includes at least one of:

data included in service requests for the set of network service configurations, data identifying the set of network service configurations, wherein the data identifying the set of network service configurations excludes information that indicates times at which particular network services or particular network service features were created, updated, deleted, or implemented, outcome data that includes data identifying a manner in which the set of network service configurations were used, or telemetry data that identifies events caused by network traffic that was sent via the set of network devices that were implementing the set of network service configurations.

19. The non-transitory computer-readable medium of claim 15, wherein network services that are part of the set of candidate network service configurations include at least one of:

a packet filtering service, a packet translation service, an authentication service, a classification service, a security service, a proxy service, a content filtering service, or a packet forwarding service.

20. The non-transitory computer-readable medium of claim 15, wherein the one or more instructions, that cause the one or more processors to perform the group of one or more actions, cause the one or more processors to:

provide, after selecting the second group of one or more actions, the set of network devices with a set of instructions for the particular network service configuration to cause the set of network devices to use the set of instructions to implement the particular network service configuration.

* * * * *

UNITED STATES PATENT AND TRADEMARK OFFICE
CERTIFICATE OF CORRECTION

PATENT NO. : 11,252,046 B2
APPLICATION NO. : 16/221441
DATED : February 15, 2022
INVENTOR(S) : Venkata Rama Raju Manthena Page 1 of 1

It is certified that error appears in the above-identified patent and that said Letters Patent is hereby corrected as shown below:

In the Claims

In Claim 2, Column 33, Line 35, "wherein the graphical data model ii a Hidden Markov Model (HMM); and wherein the" should be changed to -- wherein the updating the set of model parameters comprises: --.

In Claim 8, Column 34, Line 37, "update, while executing HMM one or more times" should be changed to -- update, while executing the HMM one or more times --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*